(12) United States Patent
Maxwell et al.

(10) Patent No.: US 12,393,917 B2
(45) Date of Patent: Aug. 19, 2025

(54) INTERACTIVE DIGITAL RECEIPT

(71) Applicant: Block, Inc., Oakland, CA (US)

(72) Inventors: David W. Maxwell, San Francisco, CA (US); Tyler James Lettau, Hercules, CA (US); Lauren A. Myrick, San Francisco, CA (US); Daniel G. Becker, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/475,081

(22) Filed: Sep. 26, 2023

(65) Prior Publication Data

US 2024/0020659 A1 Jan. 18, 2024

Related U.S. Application Data

(63) Continuation of application No. 16/588,997, filed on Sep. 30, 2019, now Pat. No. 11,810,078, which is a
(Continued)

(51) Int. Cl.
*G06Q 20/04* (2012.01)
*G06Q 20/12* (2012.01)
(Continued)

(52) U.S. Cl.
CPC .......... *G06Q 20/047* (2020.05); *G06Q 20/12* (2013.01); *G06Q 20/209* (2013.01); *G06Q 20/34* (2013.01);
(Continued)

(58) Field of Classification Search
None
See application file for complete search history.

(56) References Cited

U.S. PATENT DOCUMENTS 5,276,311 A 1/1994 Hennige
5,315,093 A 5/1994 Stewart
(Continued)

FOREIGN PATENT DOCUMENTS

CA 2 930 186 A1 5/2015
EP 1107198 B1 1/2007
(Continued)

OTHER PUBLICATIONS

Advancing Payment Security: MasterCard Contaclless Security Overview, www.mastercard.com, retrieved from nternet URL: https://www.mastercard.com/contaclless/doc/MasterCardContaclless_SecurityFactSheet_2015.pdf, on Jun. 12, 2017, pp. 1-4.
(Continued)

*Primary Examiner* — Jamie R Kucab
(74) *Attorney, Agent, or Firm* — Lee & Hayes, P.C.

(57) ABSTRACT

A technique is disclosed for generating an interactive digital receipt on a device associated with a customer, where the receipt offers transaction information associated with a transaction and one or more interactive components. In one embodiment, one or more servers of a payment service generates the interactive digital receipt. The interactive digital receipt includes an interactive feedback component as one of the one or more interactive components. A determination can be made by the one or more servers that feedback was received within a timeframe satisfying a timeframe criterion. Based on determining that the feedback was received within the timeframe, a reward can be transmitted by the one or more servers to the device associated with the customer.

20 Claims, 14 Drawing Sheets

Related U.S. Application Data continuation of application No. 14/088,113, filed on Nov. 22, 2013, now abandoned.

(60) Provisional application No. 61/901,986, filed on Nov. 8, 2013.

(51) Int. Cl.

| | | |
|---|---|---|
| *G06Q 20/20* | (2012.01) | |
| *G06Q 20/34* | (2012.01) | |
| *G06Q 30/02* | (2023.01) | |
| *G06Q 30/0207* | (2023.01) | |
| *G06Q 30/0234* | (2023.01) | |
| *G06Q 30/0235* | (2023.01) | |
| *G06Q 30/06* | (2023.01) | |

(52) U.S. Cl.
CPC ..... *G06Q 30/0207* (2013.01); *G06Q 30/0234* (2013.01); *G06Q 30/0235* (2013.01); *G06Q 30/0281* (2013.01); *G06Q 30/06* (2013.01)

(56) References Cited

U.S. PATENT DOCUMENTS

| | | | |
|---|---|---|---|
| 5,530,232 A | 6/1996 | Taylor | |
| 5,585,787 A | 12/1996 | Wallerstein | |
| 5,590,038 A | 12/1996 | Pitroda | |
| 5,878,337 A | 3/1999 | Joao et al. | |
| 6,026,387 A | 2/2000 | Kesel | |
| 6,175,922 B1 | 1/2001 | Wang | |
| 6,341,353 B1* | 1/2002 | Herman | A63F 13/12 726/5 |
| 6,378,075 B1* | 4/2002 | Goldstein | G06Q 20/02 726/16 |
| 6,422,462 B1 | 7/2002 | Cohen | |
| 6,427,911 B1 | 8/2002 | Barnes et al. | |
| 6,764,005 B2 | 7/2004 | Cooper | |
| 6,898,598 B2* | 5/2005 | Himmel | G06Q 30/04 |
| 7,010,495 B1 | 3/2006 | Samra et al. | |
| 7,136,448 B1 | 11/2006 | Venkataperumal et al. | |
| 7,155,411 B1 | 12/2006 | Blinn et al. | |
| 7,353,203 B1 | 4/2008 | Kriplani et al. | |
| 7,406,436 B1 | 7/2008 | Reisman | |
| 7,493,390 B2 | 2/2009 | Bobde et al. | |
| 7,552,087 B2 | 6/2009 | Schultz et al. | |
| 7,575,166 B2 | 8/2009 | Mcnamara | |
| 7,580,873 B1 | 8/2009 | Silver et al. | |
| D621,849 S | 8/2010 | Anzures et al. | |
| 8,280,793 B1 | 10/2012 | Kempkes et al. | |
| 8,396,808 B2 | 3/2013 | Greenspan | |
| 8,401,710 B2 | 3/2013 | Budhraja et al. | |
| D683,755 S | 6/2013 | Phelan | |
| 8,459,544 B2 | 6/2013 | Casey et al. | |
| 8,498,900 B1 | 7/2013 | Spirin et al. | |
| 8,571,916 B1 | 10/2013 | Bruce et al. | |
| 8,577,731 B1 | 11/2013 | Cope et al. | |
| 8,577,803 B2 | 11/2013 | Chatterjee | |
| D695,306 S | 12/2013 | Gabouer et al. | |
| 8,602,296 B1 | 12/2013 | Velline et al. | |
| 8,645,014 B1 | 2/2014 | Kozlowski et al. | |
| 8,676,119 B2 | 3/2014 | Cohen et al. | |
| 8,694,357 B2 | 4/2014 | Ting et al. | |
| 8,712,854 B1 | 4/2014 | Rafferty et al. | |
| 8,732,085 B2 | 5/2014 | Bennett | |
| 8,843,385 B2 | 9/2014 | Jurca et al. | |
| 8,892,462 B1* | 11/2014 | Borovsky | G06Q 20/405 705/17 |
| D720,765 S | 1/2015 | Xie et al. | |
| D720,766 S | 1/2015 | Mandal et al. | |
| D725,133 S | 3/2015 | Smirin et al. | |
| D725,666 S | 3/2015 | Tseng et al. | |
| 8,972,298 B2 | 3/2015 | Kunz et al. | |
| D732,059 S | 6/2015 | Andersen et al. | |
| 9,064,249 B1 | 6/2015 | Borovsky et al. | |
| 9,183,480 B1 | 11/2015 | Quigley et al. | |
| 9,224,141 B1 | 12/2015 | Lamba et al. | |
| D748,114 S | 1/2016 | Leyon | |
| D752,604 S | 3/2016 | Zhang | |
| D752,605 S | 3/2016 | Wang | |
| 9,542,681 B1 | 1/2017 | Borovsky et al. | |
| 9,619,792 B1 | 4/2017 | Aaron et al. | |
| D786,906 S | 5/2017 | Andersen et al. | |
| 9,704,146 B1 | 7/2017 | Morgan et al. | |
| 9,727,912 B1 | 8/2017 | Poursartip et al. | |
| 9,824,394 B1 | 11/2017 | Boates et al. | |
| 9,836,739 B1 | 12/2017 | Borovsky et al. | |
| 9,864,986 B1 | 1/2018 | White et al. | |
| 9,875,469 B1 | 1/2018 | Chin et al. | |
| 9,881,305 B1 | 1/2018 | Lewis et al. | |
| 9,922,321 B2 | 3/2018 | Aaron et al. | |
| 9,978,099 B2 | 5/2018 | Rephlo et al. | |
| 10,217,092 B1 | 2/2019 | Maxwell et al. | |
| 10,387,882 B2 | 8/2019 | Hagen et al. | |
| 10,417,635 B1 | 9/2019 | Aaron | |
| 10,430,797 B1 | 10/2019 | Borovsky et al. | |
| 10,535,054 B1 | 1/2020 | Spitzer et al. | |
| 10,607,199 B2 | 3/2020 | Cassel et al. | |
| 10,621,563 B1 | 4/2020 | Spindel et al. | |
| 10,692,072 B1 | 6/2020 | Borovsky et al. | |
| 10,789,585 B2 | 9/2020 | Sanchez et al. | |
| 10,885,515 B1 | 1/2021 | Borovsky et al. | |
| 11,810,078 B2 | 11/2023 | Maxwell et al. | |
| 2003/0033272 A1* | 2/2003 | Himmel | G06Q 30/04 |
| 2003/0065805 A1 | 4/2003 | Barnes | |
| 2003/0115126 A1 | 6/2003 | Pitroda | |
| 2003/0115285 A1 | 6/2003 | Lee et al. | |
| 2003/0204447 A1 | 10/2003 | Dalzell et al. | |
| 2004/0030601 A1 | 2/2004 | Pond et al. | |
| 2004/0103065 A1 | 5/2004 | Kishen et al. | |
| 2004/0193489 A1 | 9/2004 | Boyd et al. | |
| 2004/0204990 A1 | 10/2004 | Lee et al. | |
| 2004/0215520 A1 | 10/2004 | Butler et al. | |
| 2004/0219971 A1 | 11/2004 | Ciancio et al. | |
| 2005/0055582 A1 | 3/2005 | Bazakos et al. | |
| 2005/0246245 A1 | 11/2005 | Satchell et al. | |
| 2006/0032906 A1 | 2/2006 | Sines | |
| 2006/0131385 A1 | 6/2006 | Kim | |
| 2006/0206488 A1 | 9/2006 | Distasio | |
| 2006/0229896 A1 | 10/2006 | Rosen et al. | |
| 2007/0073619 A1 | 3/2007 | Smith | |
| 2007/0150387 A1 | 6/2007 | Seubert et al. | |
| 2007/0208930 A1 | 9/2007 | Blank et al. | |
| 2007/0244766 A1 | 10/2007 | Goel | |
| 2007/0255653 A1 | 11/2007 | Tumminaro et al. | |
| 2007/0255662 A1 | 11/2007 | Tumminaro | |
| 2008/0040265 A1 | 2/2008 | Rackley et al. | |
| 2008/0077506 A1 | 3/2008 | Rampell et al. | |
| 2008/0078831 A1 | 4/2008 | Johnson et al. | |
| 2008/0133351 A1 | 6/2008 | White et al. | |
| 2008/0177624 A9 | 7/2008 | Dohse | |
| 2008/0177826 A1 | 7/2008 | Pitroda | |
| 2008/0197201 A1 | 8/2008 | Manessis et al. | |
| 2008/0222047 A1 | 9/2008 | Boalt | |
| 2008/0262925 A1 | 10/2008 | Kim et al. | |
| 2008/0270246 A1 | 10/2008 | Chen | |
| 2008/0277465 A1 | 11/2008 | Pletz et al. | |
| 2008/0296978 A1 | 12/2008 | Finkenzeller et al. | |
| 2009/0043702 A1 | 2/2009 | Bennett | |
| 2009/0063312 A1 | 3/2009 | Hurst | |
| 2009/0094126 A1 | 4/2009 | Killian et al. | |
| 2009/0099961 A1 | 4/2009 | Ogilvy | |
| 2009/0119190 A1 | 5/2009 | Realini | |
| 2009/0171843 A1 | 7/2009 | Lee et al. | |
| 2009/0204472 A1 | 8/2009 | Einhorn | |
| 2009/0240558 A1 | 9/2009 | Bandy et al. | |
| 2009/0266884 A1 | 10/2009 | Killian et al. | |
| 2009/0271265 A1 | 10/2009 | Lay et al. | |
| 2009/0288012 A1 | 11/2009 | Hertel et al. | |
| 2009/0319638 A1 | 12/2009 | Faith et al. | |
| 2010/0082420 A1 | 4/2010 | Trifiletti et al. | |
| 2010/0102125 A1 | 4/2010 | Gatto | |
| 2010/0125495 A1 | 5/2010 | Smith et al. | |
| 2010/0217674 A1 | 8/2010 | Kean | |

(56) References Cited

U.S. PATENT DOCUMENTS

| | | |
|---|---|---|
| 2010/0217675 A1 | 8/2010 | Bookstaff |
| 2010/0269059 A1 | 10/2010 | Othmer et al. |
| 2010/0306099 A1 | 12/2010 | Hirson et al. |
| 2010/0332265 A1 | 12/2010 | Smith |
| 2011/0035319 A1 | 2/2011 | Brand et al. |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0106659 A1 | 5/2011 | Faith et al. |
| 2011/0112897 A1 | 5/2011 | Tietzen et al. |
| 2011/0125633 A1 | 5/2011 | Aaltonen et al. |
| 2011/0131128 A1 | 6/2011 | Vaeaenaenen |
| 2011/0145049 A1 | 6/2011 | Hertel et al. |
| 2011/0153438 A1 | 6/2011 | Dragt |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0231270 A1 | 9/2011 | Dykes et al. |
| 2011/0251892 A1 | 10/2011 | Laracey |
| 2011/0251962 A1 | 10/2011 | Hruska |
| 2011/0258014 A1 | 10/2011 | Evangelist et al. |
| 2011/0258689 A1 | 10/2011 | Cohen et al. |
| 2011/0276418 A1 | 11/2011 | Velani |
| 2011/0295722 A1 | 12/2011 | Reisman |
| 2011/0295750 A1 | 12/2011 | Rammal et al. |
| 2011/0302019 A1 | 12/2011 | Proctor et al. |
| 2011/0313840 A1 | 12/2011 | Mason et al. |
| 2011/0313867 A9 | 12/2011 | Silver |
| 2012/0011062 A1 | 1/2012 | Baker et al. |
| 2012/0011072 A1 | 1/2012 | Lodolo |
| 2012/0016731 A1 | 1/2012 | Smith et al. |
| 2012/0030044 A1 | 2/2012 | Hurst |
| 2012/0059718 A1 | 3/2012 | Ramer et al. |
| 2012/0066065 A1 | 3/2012 | Switzer |
| 2012/0084210 A1 | 4/2012 | Farahmand |
| 2012/0095867 A1 | 4/2012 | McKelvey |
| 2012/0109693 A1* | 5/2012 | Smith .................. G06Q 40/08 705/17 |
| 2012/0136731 A1* | 5/2012 | Kidron ................ G16H 10/60 705/15 |
| 2012/0143772 A1 | 6/2012 | Abadir |
| 2012/0150611 A1 | 6/2012 | Isaacson et al. |
| 2012/0166311 A1 | 6/2012 | Dwight et al. |
| 2012/0166331 A1 | 6/2012 | Varsavsky et al. |
| 2012/0197740 A1 | 8/2012 | Grigg et al. |
| 2012/0197743 A1 | 8/2012 | Grigg et al. |
| 2012/0209773 A1 | 8/2012 | Ranganathan |
| 2012/0221446 A1 | 8/2012 | Grigg et al. |
| 2012/0253852 A1 | 10/2012 | Pourfallah et al. |
| 2012/0254031 A1 | 10/2012 | Walker et al. |
| 2012/0271707 A1 | 10/2012 | Harrison et al. |
| 2012/0271725 A1 | 10/2012 | Cheng |
| 2012/0278727 A1 | 11/2012 | Ananthakrishnan et al. |
| 2012/0290422 A1 | 11/2012 | Bhinder |
| 2012/0290484 A1 | 11/2012 | Maher |
| 2012/0310760 A1 | 12/2012 | Phillips et al. |
| 2012/0323685 A1 | 12/2012 | Ullah |
| 2013/0006773 A1 | 1/2013 | Lutnick et al. |
| 2013/0024307 A1 | 1/2013 | Fuerstenberg et al. |
| 2013/0024341 A1 | 1/2013 | Jeon et al. |
| 2013/0030879 A1 | 1/2013 | Munjal et al. |
| 2013/0030997 A1 | 1/2013 | Spodak et al. |
| 2013/0041824 A1 | 2/2013 | Gupta |
| 2013/0046643 A1 | 2/2013 | Wall et al. |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0073363 A1 | 3/2013 | Boal |
| 2013/0103946 A1 | 4/2013 | Binenstock |
| 2013/0112743 A1 | 5/2013 | Cavin et al. |
| 2013/0117329 A1 | 5/2013 | Bank et al. |
| 2013/0124361 A1 | 5/2013 | Bryson |
| 2013/0132274 A1 | 5/2013 | Henderson et al. |
| 2013/0134216 A1 | 5/2013 | Spodak et al. |
| 2013/0134962 A1 | 5/2013 | Kamel et al. |
| 2013/0138563 A1 | 5/2013 | Gilder et al. |
| 2013/0151613 A1 | 6/2013 | Dhawan et al. |
| 2013/0159172 A1 | 6/2013 | Kim |
| 2013/0166402 A1 | 6/2013 | Parento et al. |
| 2013/0173407 A1 | 7/2013 | Killian et al. |
| 2013/0181045 A1 | 7/2013 | Dessert et al. |
| 2013/0198018 A1 | 8/2013 | Baig |
| 2013/0204727 A1 | 8/2013 | Rothschild |
| 2013/0204777 A1 | 8/2013 | Irwin et al. |
| 2013/0204793 A1 | 8/2013 | Kerridge et al. |
| 2013/0218697 A1 | 8/2013 | Kinston et al. |
| 2013/0218721 A1 | 8/2013 | Borhan et al. |
| 2013/0225081 A1 | 8/2013 | Doss et al. |
| 2013/0246218 A1 | 9/2013 | Gopalan |
| 2013/0246280 A1 | 9/2013 | Kirsch |
| 2013/0254051 A1* | 9/2013 | Kim .................... G06Q 20/204 705/35 |
| 2013/0268431 A1 | 10/2013 | Mohsenzadeh |
| 2013/0290173 A1 | 10/2013 | Nemeroff |
| 2013/0291018 A1 | 10/2013 | Billings et al. |
| 2013/0297933 A1 | 11/2013 | Fiducia et al. |
| 2013/0317886 A1 | 11/2013 | Kiran et al. |
| 2013/0332354 A1 | 12/2013 | Rhee et al. |
| 2013/0346223 A1 | 12/2013 | Prabhu et al. |
| 2013/0346302 A1 | 12/2013 | Purves et al. |
| 2014/0006205 A1 | 1/2014 | Berry et al. |
| 2014/0012754 A1 | 1/2014 | Hanson et al. |
| 2014/0019236 A1 | 1/2014 | Argue et al. |
| 2014/0040052 A1* | 2/2014 | Arthur ................. G06Q 20/322 705/16 |
| 2014/0052617 A1 | 2/2014 | Chawla et al. |
| 2014/0059466 A1 | 2/2014 | Mairs et al. |
| 2014/0074631 A1 | 3/2014 | Grossman et al. |
| 2014/0074658 A1 | 3/2014 | Sanchez |
| 2014/0074716 A1 | 3/2014 | Ni |
| 2014/0081853 A1 | 3/2014 | Sanchez et al. |
| 2014/0096179 A1 | 4/2014 | Ben-shalom et al. |
| 2014/0100931 A1 | 4/2014 | Sanchez et al. |
| 2014/0100991 A1 | 4/2014 | Lenahan et al. |
| 2014/0101737 A1 | 4/2014 | Rhee |
| 2014/0114775 A1 | 4/2014 | Clion et al. |
| 2014/0122345 A1 | 5/2014 | Argue et al. |
| 2014/0129357 A1 | 5/2014 | Goodwin et al. |
| 2014/0129942 A1 | 5/2014 | Rathod et al. |
| 2014/0143157 A1 | 5/2014 | Jeffs et al. |
| 2014/0149239 A1 | 5/2014 | Argue et al. |
| 2014/0149282 A1 | 5/2014 | Philliou et al. |
| 2014/0156508 A1 | 6/2014 | Argue et al. |
| 2014/0156517 A1 | 6/2014 | Argue et al. |
| 2014/0180805 A1 | 6/2014 | Argue et al. |
| 2014/0207680 A1 | 7/2014 | Rephlo |
| 2014/0214567 A1 | 7/2014 | Llach et al. |
| 2014/0214652 A1 | 7/2014 | Zheng et al. |
| 2014/0236762 A1 | 8/2014 | Gerber et al. |
| 2014/0244462 A1 | 8/2014 | Maenpaa et al. |
| 2014/0249947 A1 | 9/2014 | Hicks et al. |
| 2014/0279098 A1 | 9/2014 | Ham |
| 2014/0279184 A1 | 9/2014 | Lai et al. |
| 2014/0344102 A1 | 11/2014 | Cooper |
| 2014/0351004 A1 | 11/2014 | Flett |
| 2014/0372300 A1 | 12/2014 | Blythe |
| 2014/0379497 A1 | 12/2014 | Varma et al. |
| 2014/0379536 A1 | 12/2014 | Varma et al. |
| 2015/0012426 A1 | 1/2015 | Purves et al. |
| 2015/0025983 A1* | 1/2015 | Cicerchi ............ G06Q 30/0633 705/15 |
| 2015/0032567 A1 | 1/2015 | Bhatia |
| 2015/0073907 A1 | 3/2015 | Purves et al. |
| 2015/0073989 A1 | 3/2015 | Green et al. |
| 2015/0112838 A1 | 4/2015 | Li et al. |
| 2015/0127553 A1 | 5/2015 | Sundaram et al. |
| 2015/0134439 A1 | 5/2015 | Maxwell et al. |
| 2015/0134528 A1 | 5/2015 | Fineman et al. |
| 2015/0142514 A1 | 5/2015 | Tutte |
| 2015/0142594 A1 | 5/2015 | Lutnick et al. |
| 2015/0186885 A1 | 7/2015 | Agrawal et al. |
| 2015/0187021 A1 | 7/2015 | Moring et al. |
| 2015/0294312 A1 | 10/2015 | Kendrick et al. |
| 2015/0304270 A1 | 10/2015 | Cook |

(56) References Cited

U.S. PATENT DOCUMENTS

| | | | |
|---|---|---|---|
| 2015/0324901 | A1 | 11/2015 | Starikova et al. |
| 2015/0332237 | A1 | 11/2015 | Aaron et al. |
| 2016/0012465 | A1 | 1/2016 | Sharp et al. |
| 2016/0019614 | A1 | 1/2016 | Dziuk |
| 2016/0086166 | A1 | 3/2016 | Pomeroy et al. |
| 2016/0092874 | A1 | 3/2016 | O'regan et al. |
| 2016/0203506 | A1 | 7/2016 | Butler et al. |
| 2016/0232527 | A1 | 8/2016 | Patterson |
| 2016/0321663 | A1 | 11/2016 | Battle |
| 2016/0328698 | A1 | 11/2016 | Kumaraguruparan et al. |
| 2018/0032997 | A1 | 2/2018 | Gordon et al. |
| 2018/0150807 | A1 | 5/2018 | Aaron et al. |
| 2018/0181941 | A1 | 6/2018 | Maxwell et al. |
| 2018/0268405 | A1 | 9/2018 | Lopez |
| 2018/0300741 | A1 | 10/2018 | Leonard et al. |
| 2019/0043039 | A1 | 2/2019 | Wilson |
| 2022/0237602 | A1 | 7/2022 | Aaron |

FOREIGN PATENT DOCUMENTS

| | | |
|---|---|---|
| KR | 10-2006-0103089 A | 9/2006 |
| WO | 2009/111857 A1 | 9/2009 |
| WO | 2015/061005 A1 | 4/2015 |
| WO | 2015/069389 A1 | 5/2015 |

OTHER PUBLICATIONS

Berger, S., et al., Web services on mobile devices—Implementation and Experience, Computer Society, Proceedings of the Fifth IEEE Workshop on Mobile Computing Systems and Applications, pp. 1-10 (Oct. 2003).

Delic, N., et al., "Mobile Payment Solution—Symbiosis Between Banks, Application Service Providers and Mobile Network Operators," Computer Society, Proceedings of the Third International Conference on Information Technology: New Generations (ITNG'06), pp. 1-5 (Apr. 2006).

Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.

Chiraag, "A payment Card that Changes Magnetic Stripe via Smartphone," published Nov. 12, 2013, Retrieved from the Internet URL: https://letstalkpayments.com/card-changes-magnetic-stripe-via-smartphone/, on Jan. 3, 2018, pp. 1-6.

Berger et al., "Web services on mobile devices—implementation and experience", 2003 Proceedings Fifth IEEE Workshop on Mobile Computing Systems and Applications, Monterey, CA, USA, pp. 100-109.

Natali et al., "Mobile Payment Solution—Symbiosis Between Banks, Application Service Providers and Mobile NetworkOperators", Third International Conference on Information Technology: New Generations (ITNG'06), Las Vegas, NV, 2006, pp. 346-350.

Joy, "Square Wallet—an iOS App updated to send gift cards," Top Apps, dated Apr. 6, 2013, Retrieved from the Internet URL: http://www.topapps.net/apple-ios/square-wallet-an-ios-app-updated-to-send-gift-cards.html/, pp. 1-3.

"PayPal Here: Credit Card Reader | Point of Sale and Mobile Credit Card Processing," PayPal.com, accessed at https://web.archive.org/web/20141202030140/https://www.paypal.com/us/webapps/mpp/credit-card-reader, accessed on Dec. 2, 2014, pp. 1-6.

* cited by examiner

RECEIPTS DASHBOARD — 300

( This Week ) — 302

( 🔍 ) — 304

| Date ˅ | Merchant ˅ | Items Purchased ˅ | Amount ˅ |
|---|---|---|---|
| Monday | Beanshop | Latte | $3.00 |
| Monday | Corner Cafe | Latte | $4.00 |
| Wednesday | Beanshop | Latte | $3.00 |
| Wednesday | Beanscenery | Latte | $2.50 |
| Thursday | Beanshop | Latte | $3.50 |
| Thursday | Corner Cafe | Latte | $5.00 |
| Friday | Beanshop | Latte | $2.00 |
| Saturday | Beanshop | Latte | $2.00 |

*FIG. 3*

INTERACTIVE DIGITAL RECEIPT

PRIORITY CLAIM

This application claims priority to U.S. patent application Ser. No. 16/588,997, filed Sep. 30, 2019, which claims priority to U.S. patent application Ser. No. 14/088,113, filed Nov. 22, 2013, which claims priority to U.S. Provisional Patent Application No. 61/901,986, filed on Nov. 8, 2013, the entire contents of which are incorporated herein by reference.

BACKGROUND

Due to the increasing popularity and acceptance of the computer and mobile devices, more and more financial transactions between merchants and customers are being conducted electronically. Many merchants have started to provide their customers with receipts electronically to maintain record of the financial transactions. For example, some merchants may provide a receipt through delivery of an electronic mail (i.e., e-mail). In another example, some merchants may make the receipt available through an online customer account on a merchant website. Various solutions are currently available to provide such receipt electronically, such as building an internal solution specific to a merchant's point of sale (POS) system or integrating with a third party solution into the merchant's POS.

The existing receipt solutions, however, are often limited in functionality and present many issues for both merchants and customers. For a customer, the receipts from the different merchants often get delivered in different ways (e.g., format, delivery method, etc.), and as such the customer is unable to manage the receipts digitally. For a merchant, a highly customized infrastructure change to existing POS system is needed in order to have a receipt solution that fits the merchant's needs; the merchant may not be ready to make such changes based on the business size, the cost, and/or the required technical knowledge. Further, the efforts required for such changes do not translate well in terms of a return on investment; the existing digital receipt solutions merely provide a record for the transactions, and nothing more.

Accordingly, a more robust, versatile system for providing a receipt electronically is needed.

BRIEF DESCRIPTION OF THE DRAWINGS

One or more embodiments of the present invention are illustrated by way of example and are not limited by the figures of the accompanying drawings, in which like references indicate similar elements.

FIG. 3 illustrate a screenshot of a receipts dashboard for managing interactive digital receipts implemented on a user device.

DETAILED DESCRIPTION

Figure 1A:
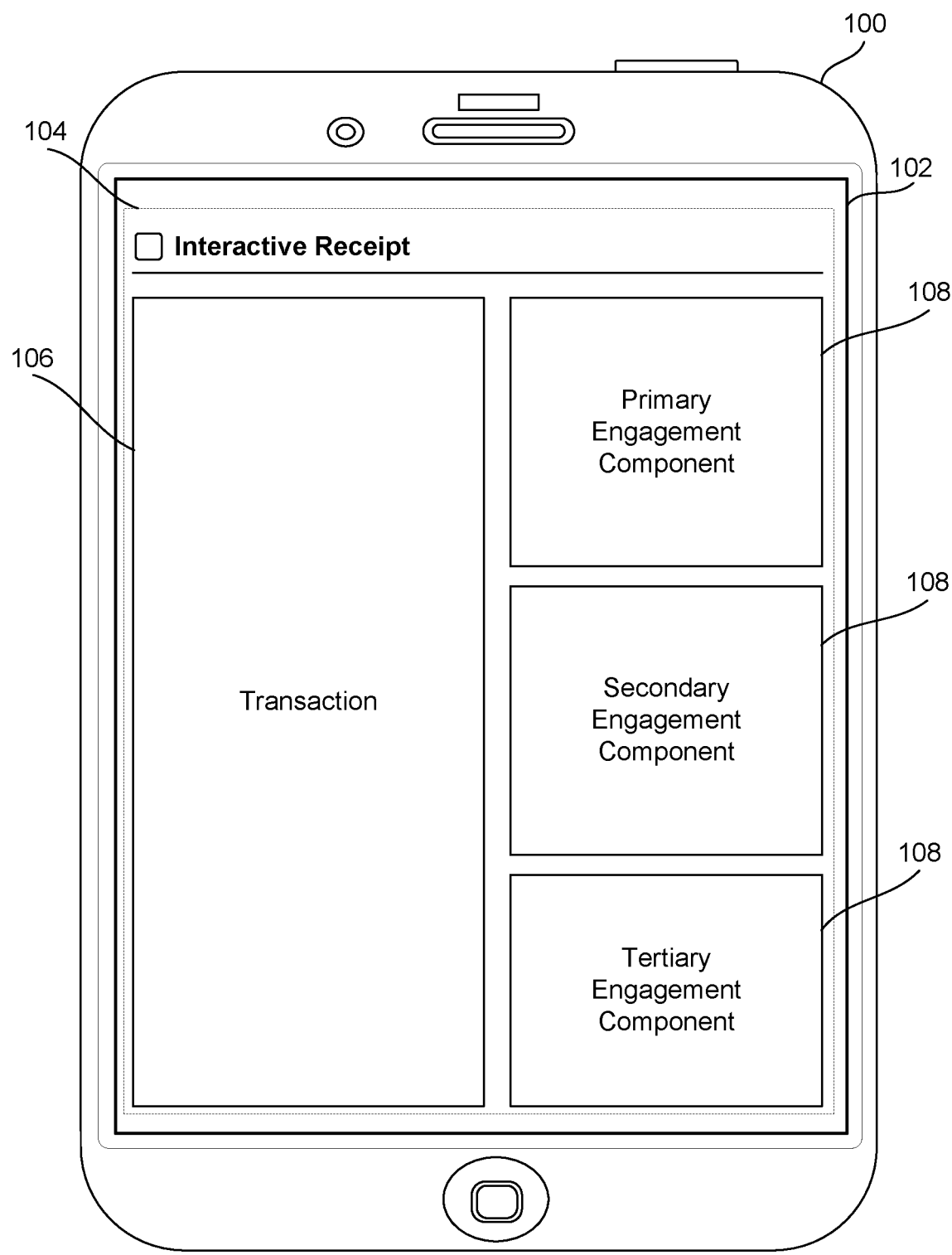
FIGS. 1A-1B illustrate a first embodiment of an interactive digital receipt technique implemented on a user device.

Introduced herein is a technique to provide an interactive digital receipt implemented on a user device, where the receipt offers an interactive platform for merchants and customers to interact on a continuous basis. The interactive digital receipt can be embodied in a text message, an electronic mail (e-mail), or a mobile software application. The interactive digital receipt is generated in response to an occurrence of a particular financial transaction between a merchant and a customer, such as a payment transaction conducted at a completion of service and/or goods provided by the merchant. The financial transaction may be an electronic transaction conducted over the Internet or a card present point-of-sale (POS) transaction where the customer/buyer/payer makes the purchase at a store front, other "brick-and-mortar" location, or simply in the presence of a merchant/payee.

Once the financial transaction takes place (i.e., the payer tenders payment to the payee), the interactive digital receipt is generated to provide the customer with an electronic record of the transaction. In addition to providing the transaction record, the interactive digital receipt provides one or more time-based engagements, or interactive components, to enable the merchant and the customer to engage, or interact, with one another. The time-based engagements include one or more features that are configured to be available (i.e., offered via the interactive receipt) to the user for a limited, predefined time period, allowing the engagements, or the interactions, to take place only until the expiration of the time period.

In some instances, the disclosed technique provides a time-based engagement that includes a gratuity payment feature to allow the customer to add a gratuity amount (i.e., "tip") on top of a payment amount for a purchase from a particular merchant. The gratuity payment feature allows the customer to tip the merchant after the time of the actual transaction, or purchase. The merchant may set the time limit at which the interactive receipt (for the purchase) is open for receiving the gratuity amount from the customer. The customer may set a nominal gratuity amount to operate as a default amount to be paid to the merchant if no gratuity is added after a predefined time limit. For example, such nominal gratuity amount may be set for a particular favorite merchant of the customer; that is, the customer desires to always tip a nominal amount even he/she forgets to add such amount after a transaction. The time-based gratuity payment feature is beneficial, for example, when the customer has forgotten to tip and desires to tip after he/she has already made the payment and left the merchant's store. The nominal gratuity amount may also be set by the merchant. This is beneficial in scenarios involving special services and/or goods. For example, a restaurant merchant sets a default 25% tip for any transaction involving 10 or more parties dining at the restaurant.

In some instances, the disclosed technique provides a time-based engagement that includes a feedback feature to allow the customer to leave a review (e.g., a write-up, a rating, etc.) for a particular merchant after a transaction is completed. The feedback feature is offered to the customer only within a predefined time period. The merchant may configure the predefined time period. For example, the time period can be an hour, a day, or a week after a payment transaction (e.g., a restaurant visit) has completed. The merchant may configure the predefined time period to be tied to an incentive. For example, the customer is rewarded a 20% Off Coupon via the interactive receipt for submitting a review within an hour of the transaction completion time. Such time-based feedback feature is beneficial, for example, when the merchant wants to increase visibility of the merchant venue (i.e., through reviews), to incentivize the customer to act more quickly in submitting the feedback, and/or to manage the collection of feedback more effectively and in a timely manner (e.g., allowing a review six days after the service is likely ineffective).

In some instances, the disclosed technique provides a time-based engagement that includes a time-based promotion feature to incentivize the customer to interact with a particular merchant within a predefined time period. The time-based promotion feature offers the customer a particular promotional reward associated with the merchant and/or the purchase, where the promotional reward reduces, or decreases in value, corresponding to a decrease in a passage of time. For example, a promotional $10 coupon is generated via the interactive receipt the moment a particular payment transaction has occurred between Store A and Customer X, where the coupon is redeemable at Store B, which is affiliated with Store A, if the coupon is redeemed at Store B within 24 hours. In such example, the $10 value of the promotional coupon decreases based on how long it has been since the transaction at Store A has completed; the value ultimately decreases to $0 in accordance with the passage of time. In this example, the sooner the customer redeems the $10 coupon, the higher the value he/she gets to redeem.

The customer may redeem the time-based promotional reward by completing various redemption (or "promotional") activities. Some promotional activities include simply revisiting the merchant to make another purchase for goods and/or services. Some promotional activities include participating in a game via the user device. Some promotional activities include visiting another affiliated merchant (e.g., affiliated store, affiliated website, etc.). The promotional activity and the decreasing rate of the promotional reward may be configured by the merchant offering the reward. Such time-based promotional reward feature is beneficial, for example, when the merchant wants to promote certain products or services and/or to engage the customers by offering certain incentives to act more quickly. The customer, on the other hand, benefits, for example, by getting more relevant merchant rewards (e.g., discounts at the merchant's store or affiliated stores).

In some instances, the disclosed technique provides a time-based engagement that includes a loyalty rewards record for the customer, where the loyalty rewards record is associated with every transaction conducted over time between the customer and a particular merchant. The loyalty rewards record (or "rewards record") tracks the purchases and/or services made by the customer from the particular merchant, and uses the tracking to log reward points for the customer being a "loyal customer." The rewards record enables the merchant, for example, to reward the customer for purchases (e.g., a free beverage for every 10 beverages bought) and enables the customer, for example, to receive an elite membership status for purchases made within a predefined time period (e.g., 10 beverages bought within a week).

In some instances, the disclosed technique provides a particular customer an interactive transaction record containing all interactive digital receipts of transactions between the particular customer and one or more merchants. The interactive transaction record organizes the interactive digital receipts based on time, location, and merchant. The interactive transaction record is updated along with each new interactive digital receipt that gets generated and or updated. Further, the interactive transaction record allows the customer to access each interactive digital receipt. This can be beneficial when the customer wants to revisit a record for a particular transaction. For example, if a customer wants to review and add a gratuity amount to a payment transaction completed recently, he can access the interactive transaction record to search for the particular transaction and add on a tip to the payment authorization for that transaction.

In some instances, the disclosed technique provides a user interface for a particular merchant to configure various time-based engagements that may be offered via the interactive digital receipts on the user devices of one or more customers. In some instances, the interface allows the merchant to create one or more customized templates for the interactive digital receipts of particular customers. As such, the disclosed technique allows the merchant to dynamically change what is being offered, or displayed, on the user device of the frequent customer.

Other aspects and advantages of the disclosed technique will become apparent from the following description in combination with the accompanying drawings, illustrating, by way of example, the principles of the claimed technique.

Figure 1B:
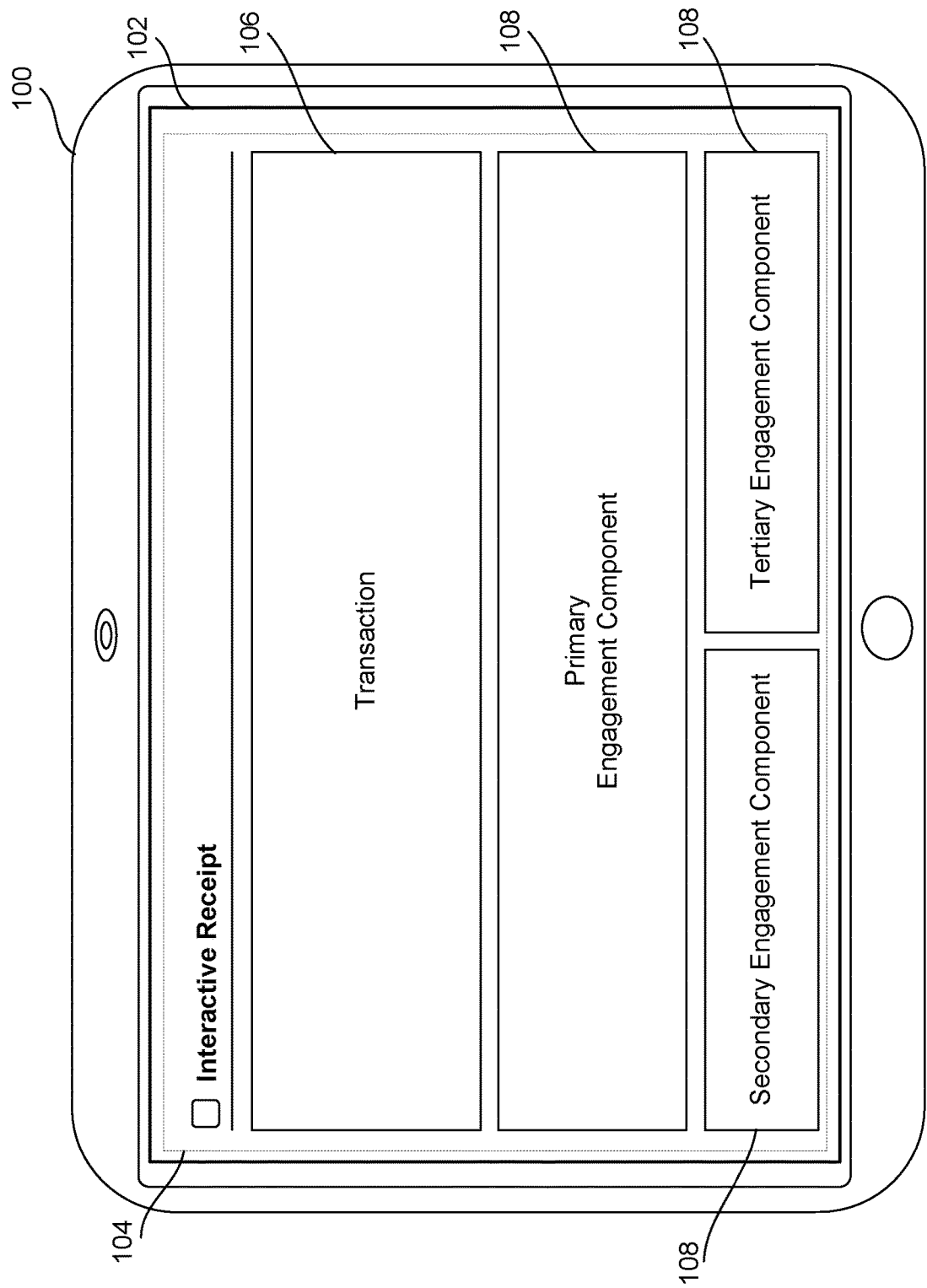

FIGS. 1A-1B illustrate a first embodiment of an interactive digital receipt technique implemented on a user device 100. As used herein, the term "user device" refers to any general-purpose computing device capable of data processing. In one example, the user device can be a mobile device, such as a smartphone (e.g., iPhone®, Android®-enabled phone, etc.), a personal digital assistant (PDA), a tablet, an e-reader, or other mobile or portable computing devices. In another example, the user device can be a personal computing device, such as a desktop, a laptop, or other wired and wireless personal computers. The user device 100 is equipped with a display screen 102 for displaying various user interfaces to enable a user to interact with content generated by the user device 100.

The user device 100 can implement an application, such as an interactive receipt mobile application for use by a mobile user, where the interactive receipt mobile application includes one or more customer interface components. As used herein, a "customer interface component" is a component of a user interface intended for a customer to view and interact with an interactive digital receipt 104. The interactive digital receipt 104 is generated for the customer after an occurrence of a financial transaction between the customer and a merchant (e.g., payment that occurs at the completion of a service and/or tendering of goods), where the interactive digital receipt 104 is displayed on the display screen 102 of the user device 100. It is noted that the interactive digital receipt 104 may take up an entirety or any portion of the display screen 102.

Referring to FIGS. 1A and 1B, the interactive digital receipt 104 includes various interactive components, such as a customer transaction interface component 106 ("transaction component") and one or more customer engagement interface components 108 ("engagement component"). The transaction component 106 displays details associated with a particular transaction between the customer and the merchant, where the transaction details are displayed in real time in response to an occurrence of the particular transaction (e.g., payment transaction at the completion of a service). For example, when the customer has made a payment to the merchant, the interactive digital receipt is automatically generated on the user device 100, and included on the receipt are details of the purchased items and prices generated by the transaction component 106.

The one or more engagement components 108 displays in real time one or more features for the merchant and the customer to interact or engage with one another. The features generated are configured to be available via the interactive digital receipt only within a predefined time period. The predefined time period is configurable by the merchant and allows the merchant to provide time-based incentives to engage the customer to interact with the merchant. Further details regarding the engagement components and the transaction component will be discussed in FIGS. 1C-1H.

Figure 1C:
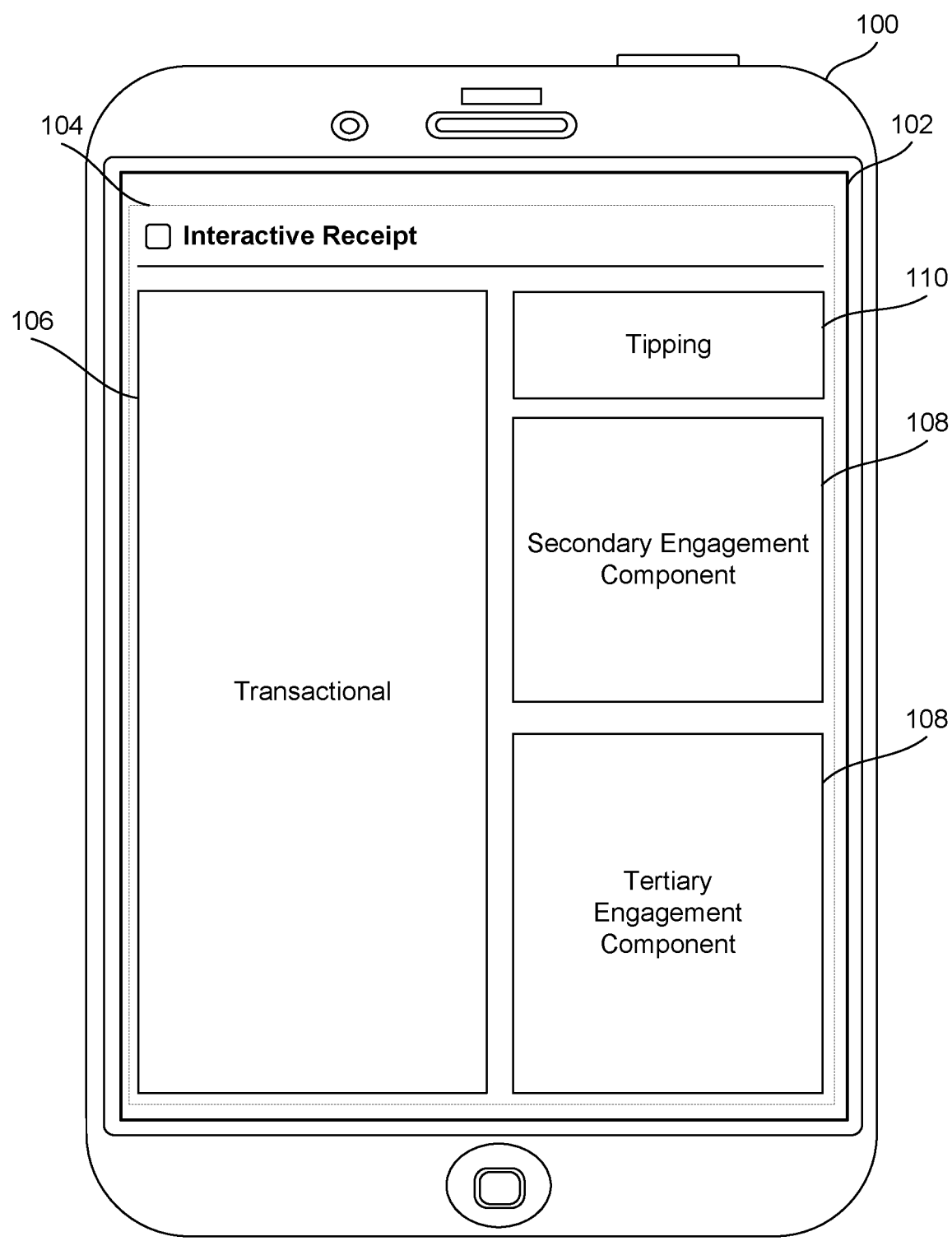
FIGS. 1C-1E illustrate a second embodiment of an interactive digital receipt technique implemented on a user device.
Figure 1D:
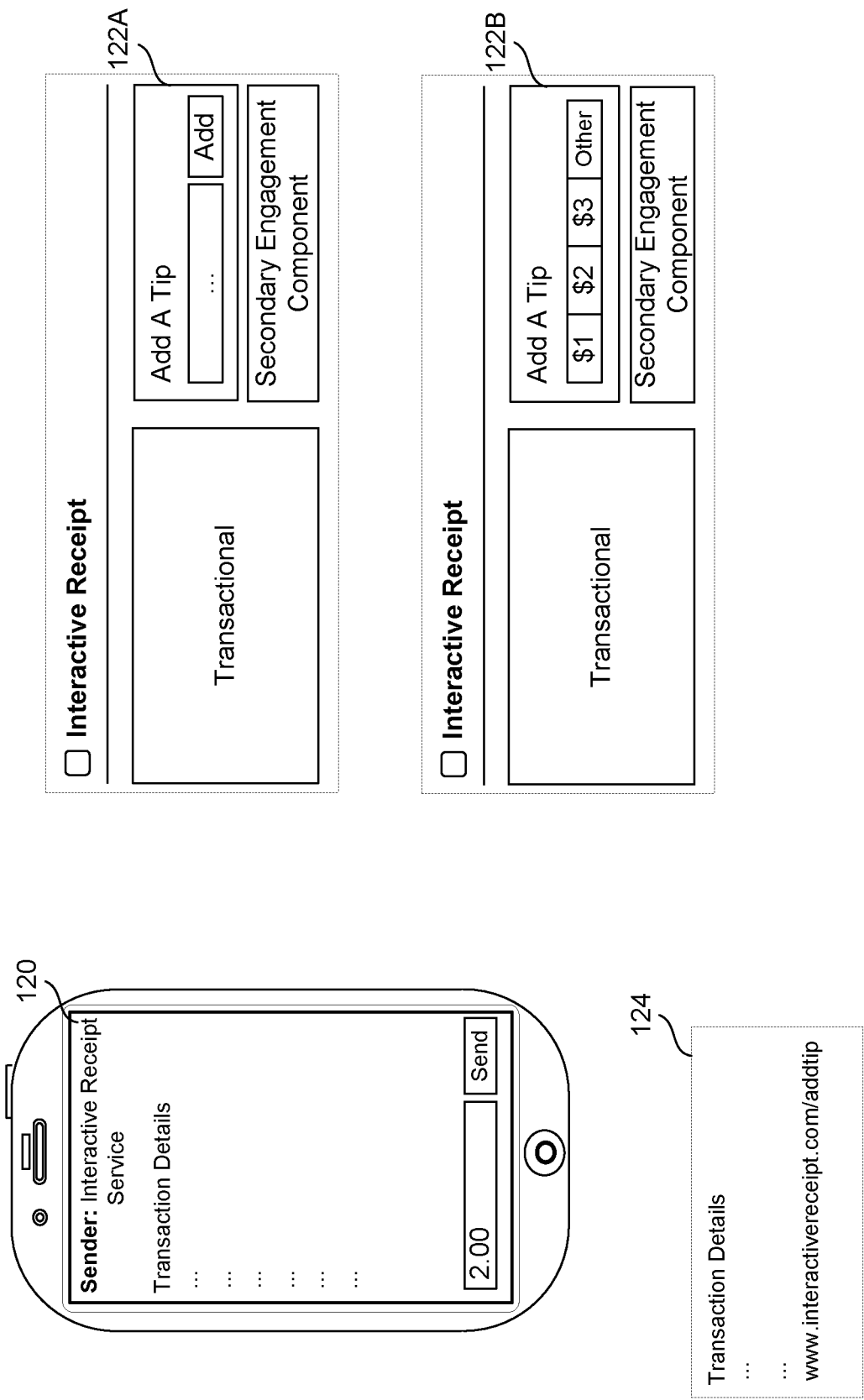
Figure 1E:
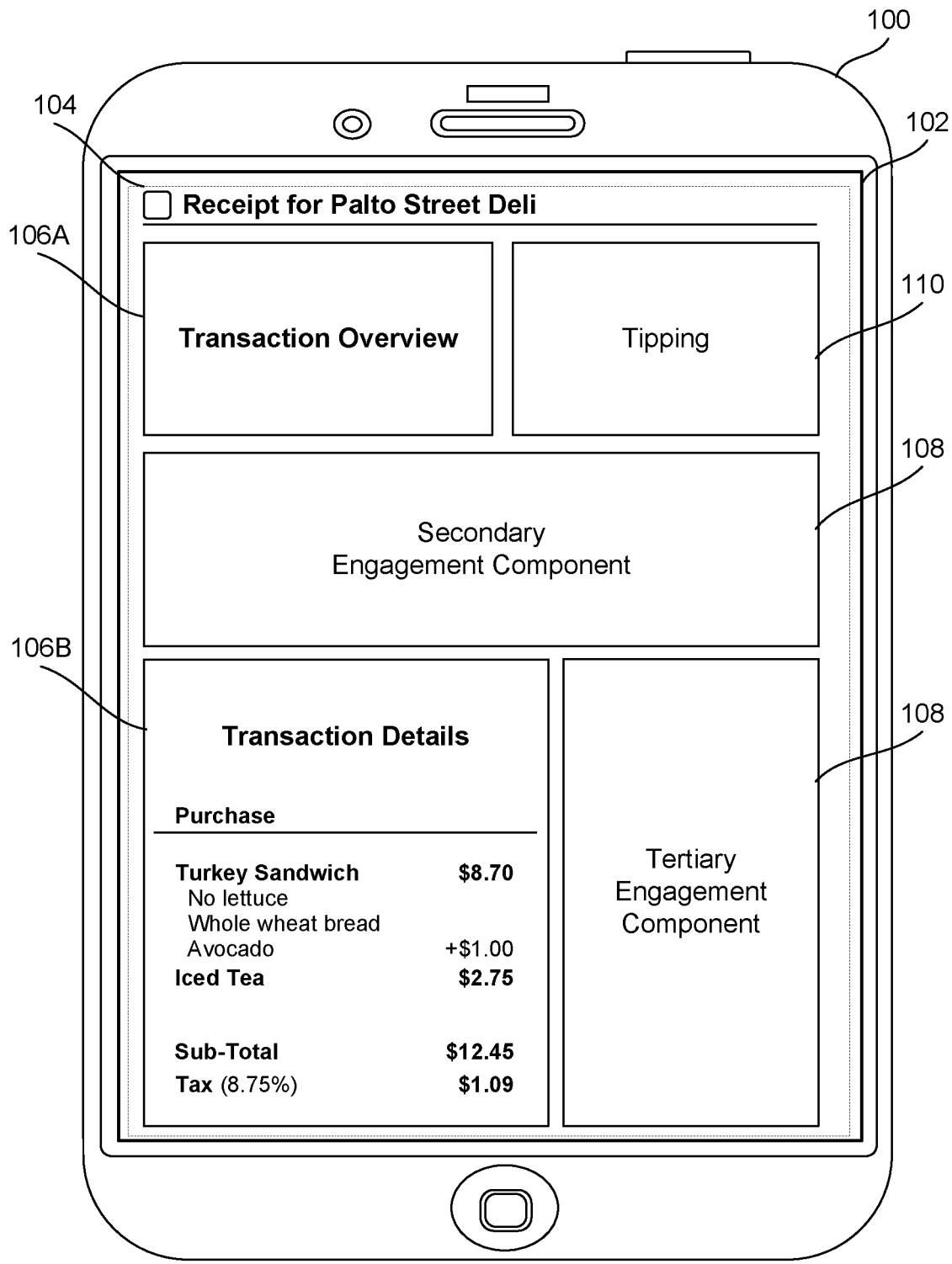

FIGS. 1C-1E illustrate a second embodiment of an interactive digital receipt technique implemented on a user device 100. As illustrated in FIG. 1C, the interactive digital receipt 104 includes an engagement, or interactive, component for generating a tipping feature 110. The tipping feature 110 allows the customer the option to add a gratuity amount (i.e., "tip") after the occurrence of a particular transaction with a merchant (e.g., tendering or completion of a payment for goods and/or service); such a transaction may be, for example, payment for a meal at a restaurant visit, where the customer is able to leave a tip after he/she has left the restaurant. The tipping feature enables any tip added by the customer to be directly transmitted to the payment system, without any human interference. For example, after the customer has tendered his credit card to the merchant to pay for a meal, the interactive digital receipt is generated on the customer's mobile device. Using the mobile device, the customer can then proceed to add a tip, and such tip (e.g., credit card authorization of the tip) is directly sent to the payment system to be added together with the already authorized payment amount, without the merchant having to physically enter and submit the tip authorization to the payment system.

The tipping feature 110 may be embodied in the interactive digital receipt in a variety of ways, as illustrated in FIG. 1D. In one example, the interactive digital receipt is a text message 120. In such example, upon receiving the receipt via text, a user can add on a tipping amount to the transaction by replying to the text message 120 and entering a number (e.g., "2.00" for a $2.00 tip). In another example, the interactive digital receipt is displayed as part of a user interface associated with a mobile application ("App"). In such example, the tipping feature 110 is a text box 122A within the interactive receipt (e.g., interactive receipt 104), and the user can add on a tipping amount by entering a number directly in the text box. The tipping feature 110 embodied within the App may also be a user interface component 122B with default tip amounts displayed to the user. The default amounts can be configured to change based on the payment amount associated with the transaction (e.g., an amount equivalent to 15%, 20%, etc.). The user can quickly add the tipping amount by clicking on any of the default amounts displayed. In yet another example, the interactive digital receipt is a Uniform Resource Locator (URL) link 124 which takes the user to a web page to allow adding of the tipping amount. The link 124 can be a part of the text message 120, a part of the text box 122A, the component 122B, or an electronic mail (e-mail).

The tipping feature 110 is configurable in various ways to implement various functionalities. In one embodiment, the tipping feature is configured to be available at any time, and for an unlimited time period, starting after a time instance when payment has been authorized (e.g., after the customer has authorized the payment amount using his/her credit card to pay the merchant). In one embodiment, the tipping feature 110 is configured to be available only for a limited, predefined time period, or timeframe, after the authorization for the payment amount has been granted by the customer. As used herein, the term "timeframe" refers to a time limit during which the tipping feature remains available for receiving a gratuity amount authorization from the customer. The timeframe may be, for example, an hour, a day, a week, or any other desired time period (e.g., unlimited). In some embodiments, the timeframe is configured by the merchant. In other embodiments, the timeframe is configured by an operator of the interactive digital receipt system.

The timeframe of the tipping feature 110 is initialized, or started, at a time instance at which the transaction between the customer and merchant has occurred (i.e., a tender of payment has been completed). The timeframe decreases incrementally, from this time instance, at a rate that corresponds to an ordinary passage of time. For example, once a customer submits a payment (e.g., authorizes payment amount via a debit card), an interactive digital receipt is generated for the customer and the timeframe for tipping associated with that receipt is initialized (i.e., the countdown starts) at the moment the receipt is generated. At the expiration of the timeframe (i.e., the countdown reaches 0), the tipping feature becomes unavailable to the customer (e.g., the feature becomes an invalidated feature). In a real-world setting, such time limitation helps the merchant manage its financial transactions more efficiently. For example, a merchant often processes its financial transactions in batches and would not want to keep any particular transaction open indefinitely.

In one embodiment, the timeframe of the tipping feature 110 may be configured to incorporate a user definition of a default gratuity amount. In particular, a user of the user device 100, such as a customer, may define a nominal gratuity amount to be automatically paid to certain merchants if no gratuity amount is submitted at the expiration of the timeframe. For example, a customer defines the gratuity amount to be $10 for the customer's favorite restaurant. In such example, the $10 tip is automatically authorized for any transaction with that restaurant whenever no gratuity amount is added at the timeframe expiration. The customer can also define the nominal gratuity amount to be zero. In some embodiments, the default gratuity amount may be defined by the merchant. For example, a restaurant merchant may want to configure a nominal gratuity amount to be defined for restaurant services to groups of six parties or more. In such example, when no tip is added to the payment amount at the end of a timeframe (e.g., 2 hours), an automatic 20% of the payment amount is authorized on the customer's payment card as the tip amount, and the 20% tip amount gets added in the final transaction payment.

Referring to FIG. 1E, the interactive digital receipt 104 can include two transaction components 106A, 106B, in addition to the tipping feature 110. The transaction component 106A includes an overview of the transaction completed between the customer and the merchant, such as the total amount of the transaction, the payment card used for the transaction (e.g., last four digits of a credit card), the date, or the like. The transaction component 106B includes the details of the transaction, such as the name of the items purchased, the quantity, the price, or the like.

Figure 1F:
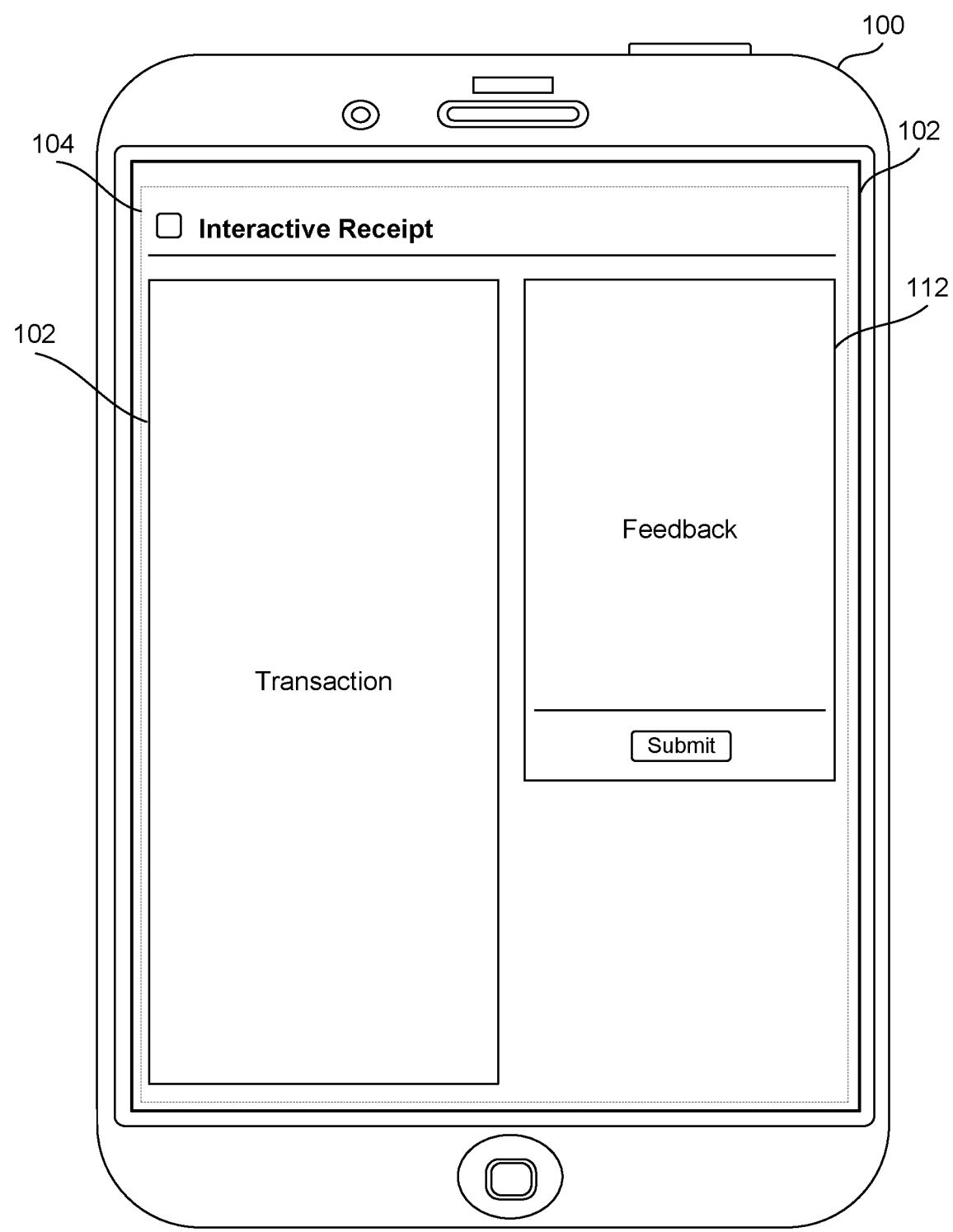
FIGS. 1F-1H illustrate a third embodiment of an interactive digital receipt technique implemented on a user device.
Figure 1G:
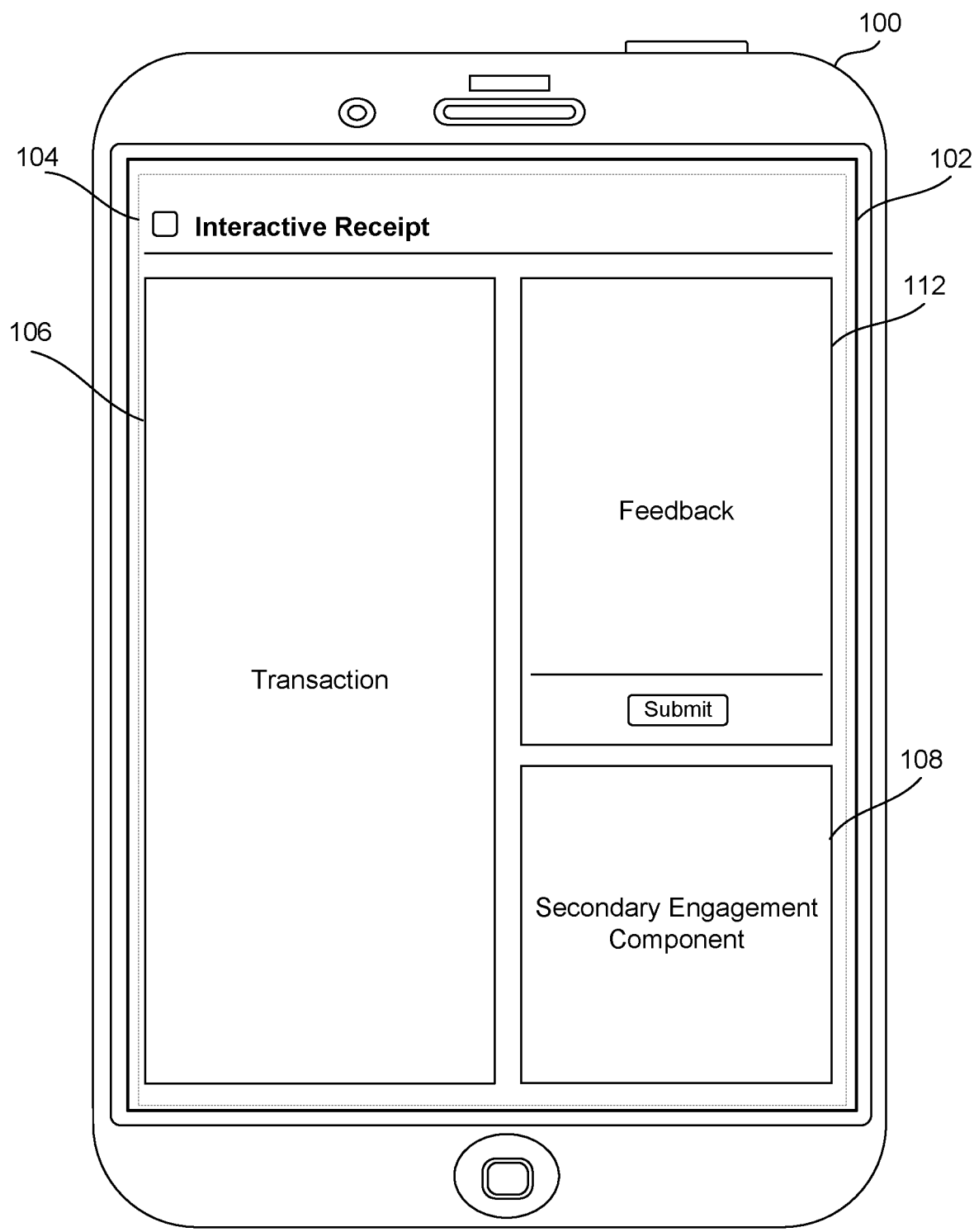
Figure 1H:
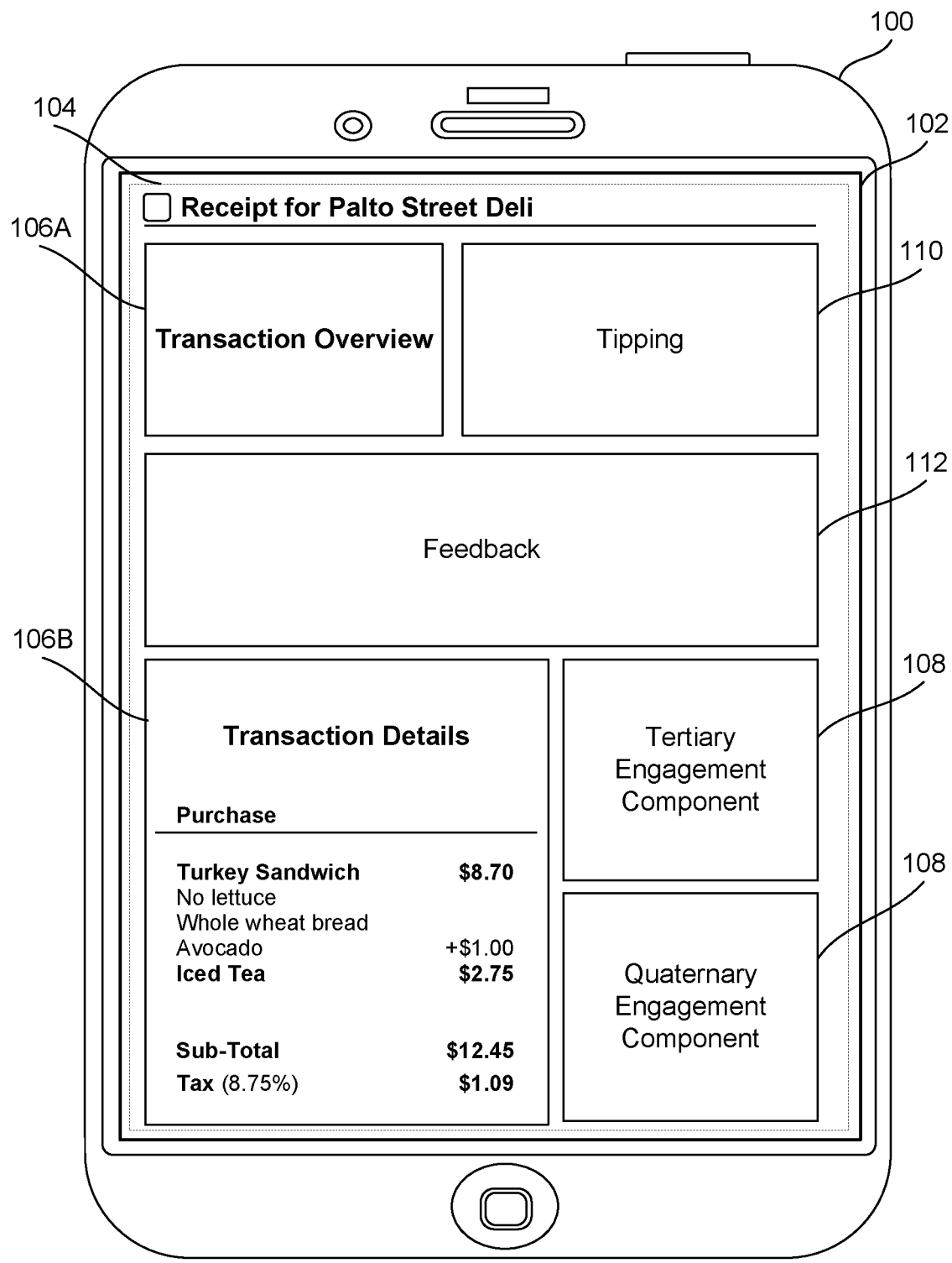

FIGS. 1F-1H illustrate a third embodiment of an interactive digital receipt technique implemented on a user device 100. As illustrated in FIG. 1F, the interactive digital receipt 104 can include an engagement, or interactive, component that contains a feedback feature 112. The feedback feature 112 allows the customer (i.e., payer, consumer, or the like) to submit feedback after the completion of a particular transaction with a merchant (i.e., payee). The feedback may include submitting, for example, a rating (e.g., 5 stars), a review, a suggestion, or the like, on various aspects of the transaction (e.g., store cleanliness, service, products, overall visit satisfaction, etc.). In some embodiments, the feedback is submitted directly to the merchant. In some embodiments, the interactive digital receipt system coordinates, communicates, and links with third party services associated with the merchant in implementing the feedback feature 112. In such embodiments, the feedback is transmitted to the third party services upon submission via the interactive digital receipt. The third party services aggregate the feedback in association with other feedback provided by the merchant. Such third party services may include, for example, Yelp.com, Urban Spoon, YP.com, and the like. In an illustrative example, the feedback feature 112 provides an option for the customer to submit indirectly a write-up review to Yelp.com by using the feedback feature 112. In such example, the customer can write the review in a text box within the interactive receipt and the review is transmitted to Yelp® when the customer clicks Submit.

In one embodiment, the feedback feature 112 is configurable to be available only for a predefined time period, or timeframe. In some embodiments, the timeframe associated with the feedback feature 112 ("feedback timeframe") is configured to be the same as the timeframe associated with tipping feature 110 ("tipping timeframe"). For example, the timeframe may be set at one hour and at the expiration of the hour, both the tipping feature and the feedback feature are made unavailable to the customer. In some embodiments, the feedback timeframe is configured to be different from the tipping timeframe. For example, the feedback timeframe may be set at one week while the tipping timeframe may be set at one hour. In such example, at the expiration of the tipping timeframe, a customer may still be able to submit feedback for the corresponding transaction.

In some embodiments, the feedback timeframe is configured by an operator of the interactive digital receipt system. For example, the feedback timeframe can be configured to be the same for all participating merchants of the interactive digital receipt system. In other embodiments, the feedback timeframe is configured by a particular merchant. For example, the merchant can configure the feedback timeframe to be one day, one week, or any desired amount.

In one embodiment, a particular merchant may configure the feedback timeframe to be tied to an incentive (i.e., "feedback reward") for encouraging submission of a feedback. The incentive may be based on a time of submission of the feedback. For example, the customer is rewarded a "20% Off Coupon" incentive, or feedback reward, if a written review is submitted before expiration of the feedback timeframe, e.g., within an hour after the time of completion of a transaction. In another example, if the feedback is submitted within 10 minutes after the completion of the payment transaction between the user and the remote user, the reward is a 20% Off coupon; on the other hand, if the feedback is submitted within 12 hours, but not exceeding the transaction timeframe allowed for the feedback (e.g., 24 hours), the reward is a 5% coupon.

The feedback feature 112 may be provided in the interactive digital receipt 104 in various configurations, as illustrated in FIGS. 1F-1G. Referring to FIG. 1G, the feedback feature 112 can be provided along with contents from the transaction component 106 and another engagement 108. Referring to FIG. 1H, the feedback feature 112 can be provided along with the tipping feature 110. The features 110, 112 may be configured according to a particular merchant's needs. For example, a merchant in the business of selling household supplies can configure the interactive digital receipt to generate the feedback feature 112 without generating the tipping feature 110. In another example, a merchant in the business of operating a restaurant can choose to have both the tipping feature 110 and the feedback feature 112 be generated in the interactive digital receipt 104. One of ordinary skill in the art will appreciate that other configurations are possible.

Figure 1I:
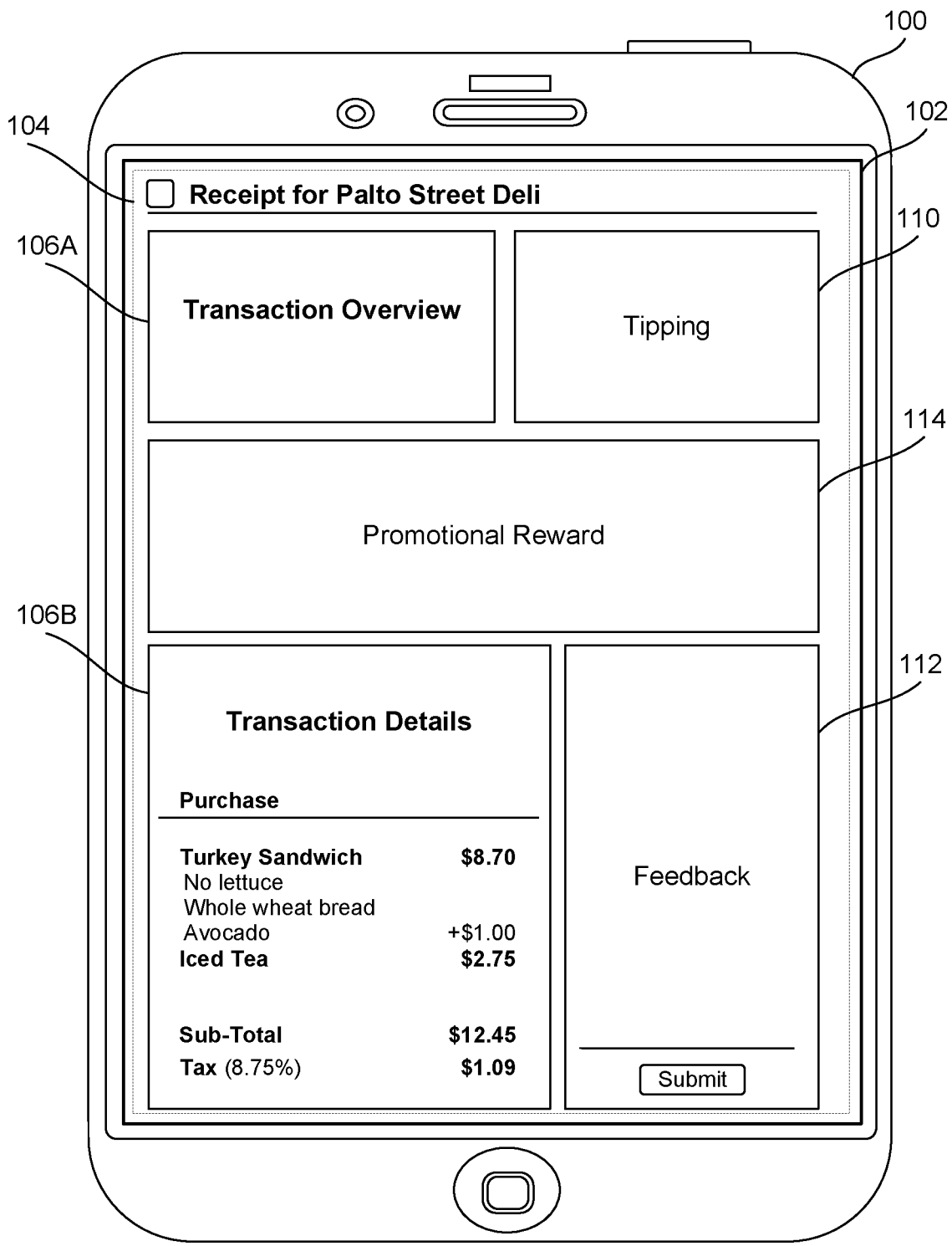
FIG. 1I illustrate a fourth embodiment of an interactive digital receipt technique implemented on a user device.

FIG. 1I illustrate a fourth embodiment of an interactive digital receipt technique implemented on a user device. As illustrated in FIG. 1I, the interactive digital receipt 104 includes an engagement, or interactive, component for generating a promotional reward feature 114. The promotional reward feature 114 allows a particular merchant to engage and incentivize a customer to interact with the merchant within a predefined time period, or timeframe. In some embodiments, the timeframe associated with the promotional reward feature 114 ("promotion timeframe") is configured to be the same as the timeframe associated with the feedback feature 112 ("feedback timeframe"), or the timeframe associated with the tipping feature 110 ("tipping timeframe"), or both. For example, the timeframe may be set at one hour, and at the expiration of the hour, the promotional reward feature, the feedback feature, and the tipping feature are all made unavailable to the customer. In some embodiments, the promotion timeframe is configured to be different from each of the feedback timeframe and the tipping timeframe.

The time-based promotional feature 114 offers the customer a particular promotional reward (or "promotion") associated with the merchant and/or the transaction completed, where the promotional reward reduces, or decreases in value, corresponding to a decrease in the passage of time associated with the timeframe. For example, a $10 coupon is generated via the interactive digital receipt the moment a restaurant payment transaction occurs (e.g., authorization of payment amount is completed). The coupon promotes the restaurant by offering the customer $10 off on a next meal at the restaurant. Such $10 coupon decreases in value from the moment the coupon is generated; ultimately, the coupon decreases to a $0 value unless the customer redeems the coupon (e.g., by buying another meal at the restaurant). As such, the sooner the customer redeems the time-based coupon, the higher the value he/she gets to redeem.

The merchant may configure the rate of the reduction in value and/or the timeframe associated with the promotional reward. In one example, the restaurant sets the $10 coupon to expire after a week, with no reduction in value at all as long as the coupon is redeemed at the end of the week. In another example, the restaurant sets the $10 coupon to expire after 3 days, where the value reduces each day until the value reaches $0 at the end of the third day. The value may reduce in accordance with the passage of time or it may reduce according to a rate set by the merchant. For example, the value decreases at an exponential rate.

In some embodiments, the customer may redeem the time-based promotional reward by completing various redemption, or promotional, activities. Some redemption activities include simply revisiting the merchant to make another purchase for goods and/or services, as discussed in the example above. Other redemption activities include participating in a game via the user device. Some redemption activities include participating in activities with other merchants affiliated with the merchant that offers the promotional reward. For example, the original merchant may offer a 15% Off Coupon, yet that coupon is redeemable only at the original merchant's affiliated store. The redemption activity and the decreasing rate of the time-based reward may be configured by the merchant offering the reward. Such configurations are beneficial as they allow the merchant to customize the promotions according to the merchant's business, such as tailoring to an advertising campaign or a targeted customer demographic.

The promotional feature 114 may be provided in the interactive digital receipt 104 in various configurations. As illustrated in FIG. 1I, the promotional feature may be combined with the tipping feature 110 and the feedback feature 112. One of ordinary skill in the art will appreciate that other configurations are possible.

Other engagements, or interactive components, not shown in FIGS. 1-1I may also be implemented via the interactive digital receipt displayed on the user device. In one embodiment, the engagement includes an interactive transaction record. The interactive transaction record includes one or more interactive digital receipts that has resulted from one or more financial transactions belonging to the customer. A particular interactive record may be configured to include only interactive digital receipts associated with a particular merchant. A particular interactive record may be configured to include all interactive digital receipts associated with the customer, including receipts associated with different merchants with whom the customer has transacted. The interactive transaction record allows the customer to organize his/her interactive digital receipts and provides a comprehensive view of all payment transactions.

In one embodiment, the engagement includes an interactive advertisement component (e.g., promotion for product and/or service) to catch the user's attention using advertisement with various content. Such advertisement may include, for example, the promotional reward feature 114 to entice the user to "click-on" or select a particular offering being displayed on the display screen. In yet another example, the advertisement may be a plain display with no interaction required from the customer, where the interaction comes from the advertisement content changing to attract the customer's attention. The advertisement content may be related to the completed transaction for which the receipt 104 is generated. For example, for a coffee purchase transaction, the advertisement includes information about a sustainable coffee alliance organization. The advertisement can also include information about nearby merchants associated with the venue where the completed transaction has taken place. In some embodiments, the interactive advertisement component is coupled to the interactive transaction record, where advertisement content is changed based on details extracted from the interactive transaction record.

The engagement, in another example, can include a loyalty rewards record associated with the customer and a particular merchant. The loyalty rewards record (or "rewards record") tracks and updates purchases and/or services completed with the merchant over time and maintains a membership status of the customer in relation to the merchant. Reward points are stored and updated in the rewards record for purchases and/or services transacted with the merchant within a predefined time period. For example, the rewards record tracks the number of baked goods bought from a bakery and updates the customer to an "elite status" in relation to that bakery for buying 10 items within 5 days. The customer, with the elite status evident on his/her rewards record, can redeem for a reward with the bakery. Other customer engagements (or interactive components) not discussed above, but consistent with the techniques discussed throughout, may also be envisioned by one of ordinary skill in the art.

Figure 2:
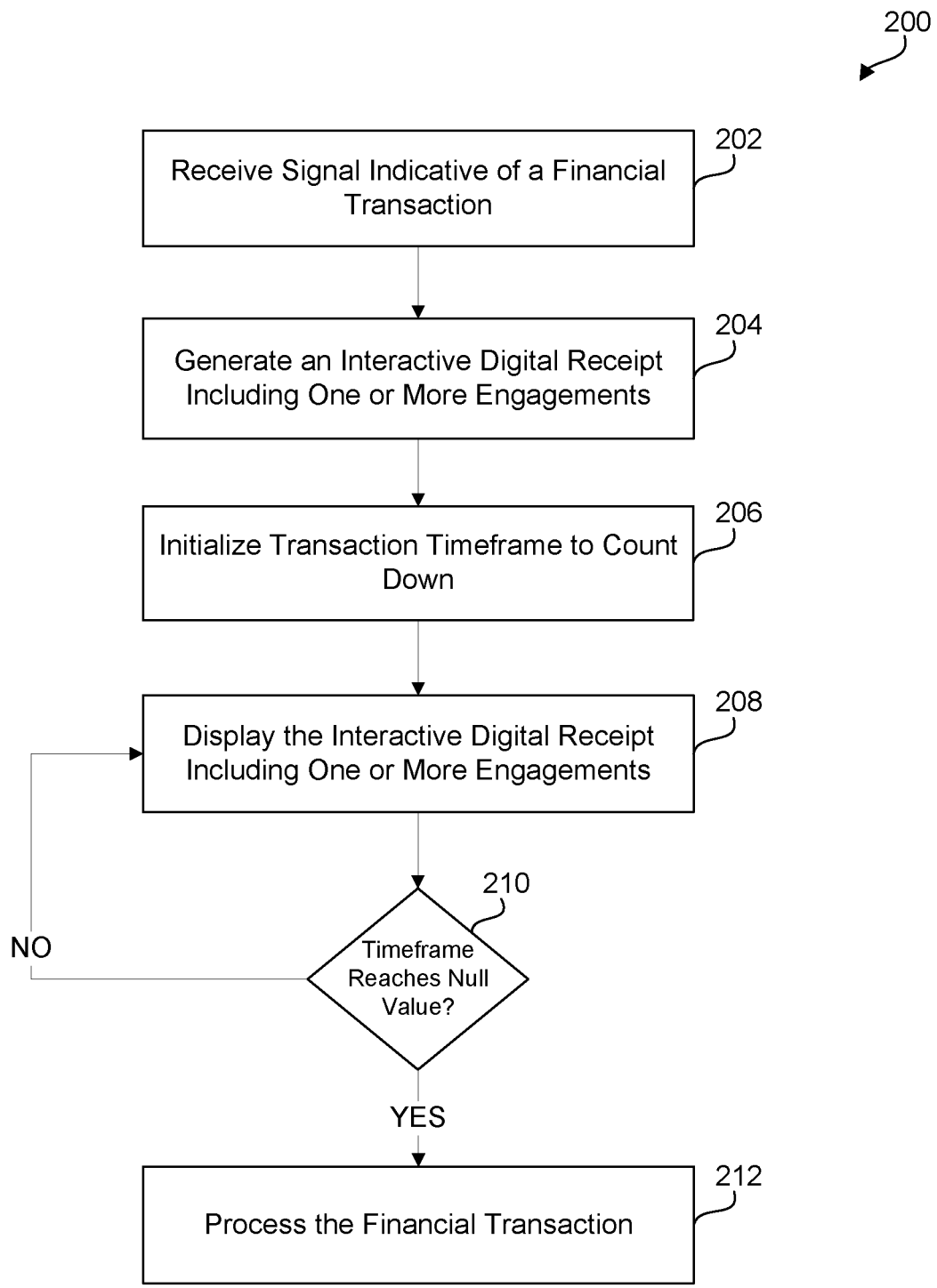
FIG. 2 illustrates a flow diagram of a process for implementing an interactive digital receipt technique on a user device.

FIG. 2 illustrates a flow diagram of a process 200 for implementing an interactive digital receipt technique on a user device. The user device may be the user device 100 of FIGS. 1A-1I. In some embodiments, the process 200 is implemented by the user device. In some embodiments, the process 200 is implemented by an interactive digital receipt system, such as the system 602 of FIG. 6. The interactive digital receipt system may be implemented as a mobile application on the user device, such as a smartphone.

At step 202, the user device receives a signal indicating that a financial transaction, such as a payment transaction, between a user of the user device (e.g., a customer, a payer, a buyer, etc.) and a remote user (e.g., a merchant, a seller, etc.). The signal may be communicated, or transmitted, from the remote user's POS system to indicate that the user has made a payment to the remote user (i.e., to indicate that the transaction has been completed). At step 204, the user device generates an interactive digital receipt to provide an electronic record of the transaction that has been completed between the user and the remote user. The interactive digital receipt may be the receipt 104 of FIGS. 1A-1I. The interactive digital receipt is configured to be a "living" digital receipt that continues to be maintained and updated on the user device. The receipt allows the user to engage in one or more engagements, or interactions, associated with the transaction, even after the transaction has been completed (i.e., payment has been tendered). The one or more engagements provided on the receipt are time-based and may be configured by the remote user, the user, or a combination thereof, as discussed above in the descriptions of FIGS. 1A-1I.

At step 206, the user device initializes a transaction timeframe to count down in response to the interactive digital receipt being generated; that is, the transaction timeframe starts decreasing incrementally until it reaches a null value once the receipt is generated. At step 208, the user device displays the interactive digital receipt on a display screen of the user device. The interactive digital receipt includes one or more engagements being displayed to the user on the display screen.

In one embodiment, the engagements includes a gratuity option that allows the user the capability to authorize a gratuity amount (or "tip") after the payment amount has been tendered, such as a credit card authorization of the payment amount (i.e., at step 202). The gratuity option allows any tip added by the user to be directly transmitted to the payment system. For example, once a restaurant patron has given the waiter her credit card to pay for the meal, the patron can add the tip amount by herself without needing the waiter to physically enter the additional tip amount into the payment system. In such example, the patron can simply add the tip on top of the original meal amount via the interactive digital receipt, and the additional credit card authorization is directly sent to the payment system; with the gratuity option available, the patron may choose to add the tip while she is still present at the restaurant or after she has left the restaurant.

As discussed above, in one embodiment, the gratuity option is available to the user for an indefinite time. In another embodiment, the gratuity option is limited by the transaction timeframe. In such embodiment, the user must utilize the gratuity option within the transaction timeframe, i.e., before the timeframe reaches the null value. When the timeframe reaches the null value, the gratuity option is disabled and the user is no longer able to authorize an additional transaction amount for gratuity. The timeframe may be configured to be an unlimited time period (i.e., no expiration).

As discussed above in FIGS. 1A-1I, the gratuity option may be provided, or displayed, via the interactive receipt along with other engagements, or interactive components, such as a time-based feedback option, a time-based promotional reward, and/or a rewards record. Accordingly, as discussed above, the transaction timeframe associated with the engagement(s) provided via the receipt may include one or more different timeframes for each type of engagement being displayed on the interactive digital receipt (e.g., tipping timeframe, promotion timeframe, feedback timeframe, etc.).

At step 210, the user device determines whether the transaction timeframe has reached a null value, i.e., "0" time left. If time still remains, then the device continues to display the engagements to engage the user, as indicated in step 208. If no time remains, the user device processes the transaction, as indicated in step 212. Processing the transaction may include updating the interactive digital receipt based on the user's interactions with the one or more engagements displayed on the display screen.

In one embodiment, processing the transaction at step 212 may include transmitting to the remote system (e.g., payment system) an additional payment authorization for a gratuity amount (or "tip") submitted by the user. In one example, the user may have chosen to interact with the gratuity option displayed at step 208 to add the gratuity amount to the transaction. In another example, the user may have predefined a nominal gratuity amount to be automatically authorized when no gratuity amount is added for a transaction with the remote user. However, if the user does not choose to interact with the gratuity option and/or to define a nominal gratuity amount, no additional payment authorization step is carried out in step 212.

In one embodiment, processing the transaction at step 212 may include updating the remote user's database with feedback completed by the user via the interactive digital receipt. The processing may also include transmitting to the user an incentive reward for completing (i.e., submitting) the feedback. As discussed above, the incentive reward may be based on a time of submission of the feedback.

In one embodiment, processing the transaction at step 212 may include processing for the user (e.g., customer) a time-based reward for completing a redemption activity associated with the remote user (e.g., merchant). The time-based reward may be maintained and accessed via the interactive digital receipt, where the user may choose to use the reward at any time after the redemption activity has been completed.

In one embodiment, processing the transaction at step 212 may include updating one or more records associated with the user. Updating the records may include updating the user's loyalty rewards record and updating the user's interactive transaction record. The interactive transaction record includes one or more interactive digital receipts resulting from one or more financial transactions belonging to the user. A particular interactive record may be configured to include only interactive digital receipts associated with a particular merchant. A particular interactive record may be configured to include all interactive digital receipts associated with the user, including receipts associated with different merchants with whom the user has transacted.

Updating the user's loyalty rewards record may include analyzing details of the transaction between the user and the remote user (i.e., the completed transaction of step 202). Analysis of such details allows the user device to update the quantity of a particular item the user has transacted with the remote user (e.g., 3 purchased beverages) and update the user's membership status.

Updating the user's interactive transaction record may include adding the interactive digital receipt associated with the completed transaction to a list of existing interactive digital receipts. The interactive transaction record may be stored on the user device.

FIG. 3 illustrate a screenshot of a receipts dashboard 300 for managing interactive digital receipts. The receipts dashboard 300 may be embodied as the interactive transaction record discussed above. The receipts dashboard 300 may be implemented on a user interface of a user device (e.g. user device 100 of FIGS. 1A-1I) to allow a user (e.g., a customer, a payer, a buyer, etc.) to view a list of interactive digital receipts. The interactive digital receipts are associated with one or more completed financial transactions between the user and one or more merchants.

Referring to FIG. 3, the receipts dashboard 300 includes a search feature 302 and a selection feature 304. The interactive digital receipts may be viewed and/or organized by using the selection feature 302 to select an organization based on a time, a merchant, an item type, or a transaction amount. The user may search for a particular interactive digital receipt using the search feature 304.

Figure 4:
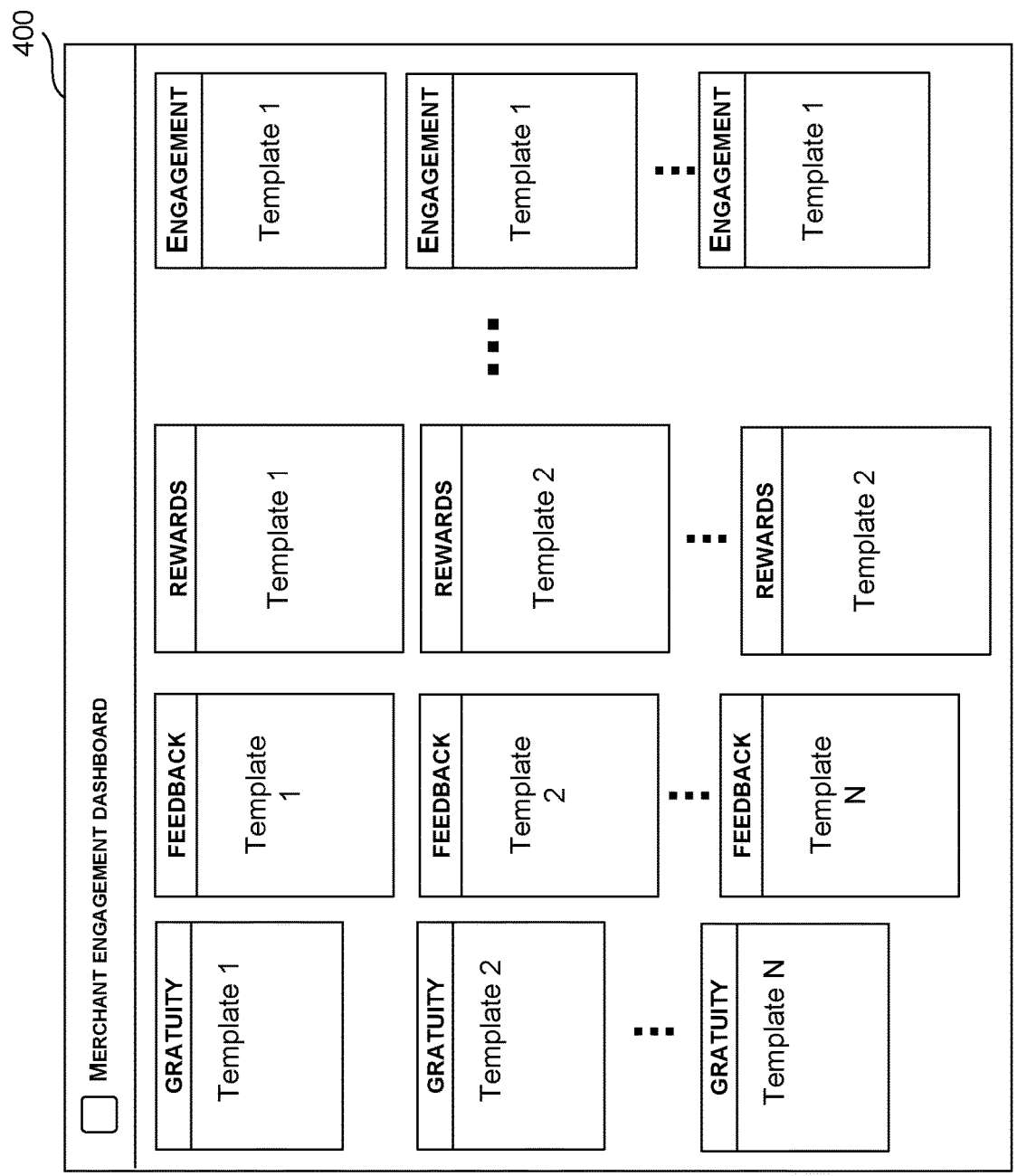
FIG. 4 illustrates a screenshot of an engagement dashboard for managing merchant engagements with customers.

FIG. 4 illustrates a screenshot of an engagement dashboard 400 for managing merchant engagements with customers. The engagement dashboard 400 may be part of a user interface implemented on a merchant computing system, such as the merchant transaction system 606 of FIG. 6. The engagement dashboard 400 is connected to an interactive digital receipt system (e.g., the system 602 of FIG. 6) that is configured to generate one or more interactive digital receipts on a user device of a customer.

The engagement dashboard 400 enables the merchant to customize various time-based engagements that may be offered via the interactive digital receipt to the customer. Using the engagement dashboard 400, the merchant may dynamically change the engagement type that is generated, or displayed, to a particular customer at the completion of every transaction. Further, the merchant may choose between different templates of a particular engagement type to be displayed. Such dynamic capability enables the merchant to utilize the interactive digital receipt according to the business needs of the merchant. For example, for a frequent customer, the merchant may choose to generate a coupon in place of a feedback invitation, which is customarily offered as the default engagement to customers. In such example, the coupon is more suited for the frequent customer who may have already submitted many feedbacks.

Figure 5:
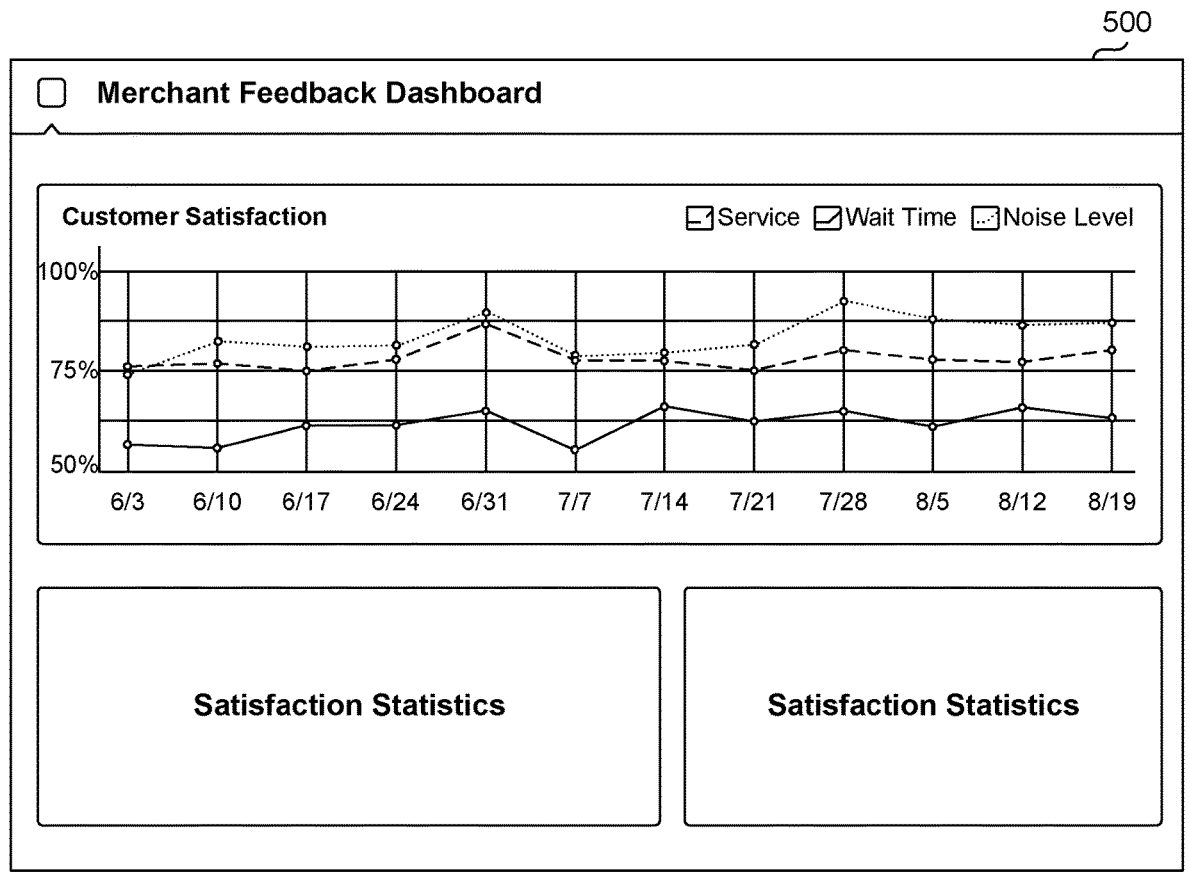
FIG. 5 illustrates a screenshot of a feedback dashboard for managing customer feedback.
Figure 6:
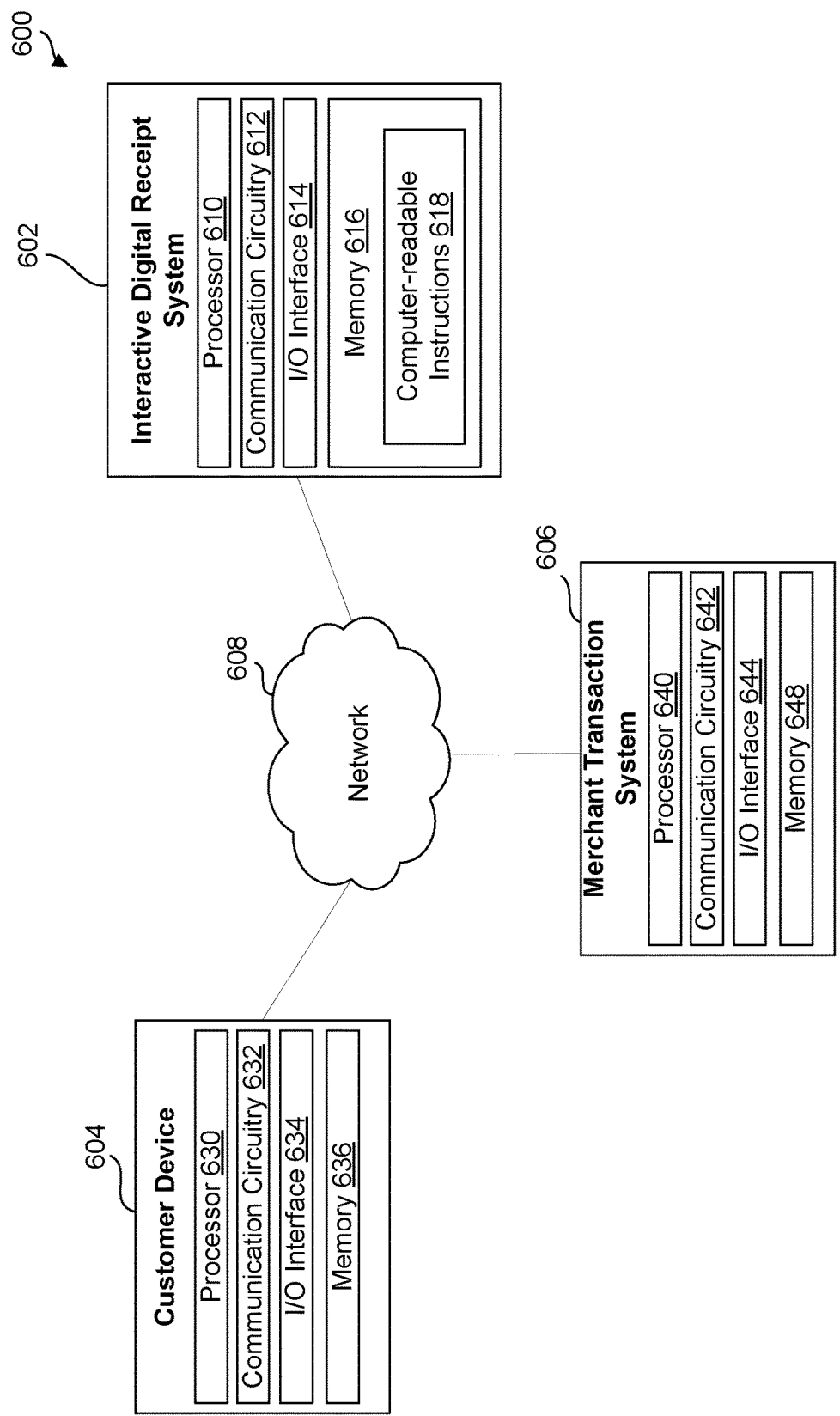
FIG. 6 illustrates an environment in which the techniques disclosed herein may be implemented.

FIG. 5 illustrates a screenshot of a merchant feedback dashboard 500 for managing customer feedback. merchant feedback dashboard 500 may be part of a user interface implemented on a merchant computing system, such as the merchant transaction system 606 of FIG. 6. The merchant feedback dashboard 500 is connected to an interactive digital receipt system (e.g., the system 602 of FIG. 6) that is configured to generate one or more interactive digital receipts on a user device of a customer. The merchant feedback dashboard 500 collects and analyzes data extracted from the feedback submitted through one or more interactive digital receipts. A particular merchant may utilize content from the feedback dashboard 500 to improve the merchant's business needs. For example, the feedback dashboard 500 may be integrated with the merchant engagement dashboard 400 to automatically generate appropriate engagements for the interactive digital receipts.

FIG. 6 illustrates an environment 600 in which the techniques disclosed herein may be implemented. The environment 600 includes an interactive digital receipt system 602, a customer device 604, and a merchant transaction system 606. As illustrated in FIG. 6, the interactive digital receipt system 602 is operatively coupled, via a network 608, to the customer device 604 and the merchant transaction system 606. In this way, the interactive digital receipt system 602 can send and receive information, to and from the merchant transaction system 606 and the customer device 604, to facilitate generating an interactive digital receipt for one or more financial transactions between the merchant and the customer. It is noted that FIG. 6 illustrates only one example of an embodiment of the environment 600, and it will be appreciated that in other embodiments, the environment may include more or fewer components and that the components may have a different configuration. Further, the various components shown in FIG. 6 may be implemented by using hardware, software, firmware or a combination thereof, including one or more signal processing and/or application specific integrated circuits.

Referring to FIG. 6, the network 608 may be a communication network based on certain communication protocols, such as TCP/IP protocol. Such network may include, but is not limited to, Internet, Intranet, wide area network (WAN), local area network (LAN), wireless network, Bluetooth, WiFi, and mobile communication network. The physical connections of the network and the communication protocols are well known to those of skill in the art.

The interactive digital receipt system 602 includes a processor 610, communications circuitry 612, an input/output interface 614, and a memory 616. These components may be coupled by one or more communication buses or other signal lines. It is noted that the system 602 can include more or fewer components.

The processor 610 includes one or more processors. The processor 610 is operatively coupled to the communication circuitry 612 and the memory 616. The processor 610 may include a digital signal processor, a microprocessor, and various analog-to-digital converters, digital-to-analog converters, and other support circuits and/or combinations thereof. The processor may be configured to execute computer/machine readable and executable instructions stored in the local memory 616 or in a remote device memory (not shown). Such instructions are implemented by the processor 610 to perform one or more functions described above. In performing such functions, the processor 610 uses the communication circuitry 612 to communicate with the network 608 and other devices on the network 608, such as the merchant transaction system 606 and the customer device 604.

The communications circuitry 612 includes RF circuitry and/or port for sending and receiving information. The RF circuitry permits transmission of information over a wireless link or network to one or more other devices and includes well-known circuitry for performing this function. For example, the RF circuitry may enable WiFi, cellular, Bluetooth, Bluetooth low energy, global positioning system (GPS), near field communication (NFC), or other types of long range or short range communication. The port permits transmission of information over a wired link. The communications circuitry may communicate, for example, with the merchant transaction system 606.

The memory 616 includes one or more memories. The one or more memories may be, for example, cache memory, main memory and secondary memory. The memory 616 includes computer-readable instructions 618, where the computer-readable instructions may be executed by the processor 610 to implement a mobile application on the customer device 604, such as an interactive digital receipt application. In some embodiments, the memory 616 may include data storage (not shown) for storing data created and/or used by to the interactive digital receipt application.

The customer device 604 may be, for example, mobile devices and computing devices that can communicate with the interactive digital receipt system 602 and the merchant transaction system 606 through the network 608. The customer device 604 can be the user device 100 of FIGS. 1A-1I. The customer device 604 includes a processor 630, communications circuitry 632, an input/output (I/O) interface 634, and a memory 636. These components may be coupled by one or more communication buses or other signal lines. It is noted that the device 604 can include more or fewer components.

The processor 630 includes one or more processors. The processor 630 is operatively coupled to the communication circuitry 632 and the memory 636. The processor 630 may include a digital signal processor, a microprocessor, and various analog-to-digital converters, digital-to-analog converters, and other support circuits and/or combinations thereof. The processor 630 may be configured to execute computer/machine readable and executable instructions stored in the local memory 636 or in a remote device memory (not shown). Such instructions are implemented by the processor 630 to perform one or more functions described above. In performing such functions, the processor 630 uses the communication circuitry 632 to communicate with the network 608 and other devices on the network 608, such as the interactive digital receipt system 602 and the merchant transaction system 606.

The communications circuitry 632 includes one or more mechanisms that enable the interactive digital receipt system 602, the customer device 604, and/or the merchant transaction system 606 to engage in communications over the network 608. The communications circuitry 632 may include RF circuitry and/or port for sending and receiving information. The RF circuitry permits transmission of information over a wireless link or network to one or more other devices and includes well-known circuitry for performing this function. The RF circuitry may enable WiFi, cellular, Bluetooth, Bluetooth low energy, global positioning system (GPS), near field communication (NFC), or other types of long range or short range communication. The port permits transmission of information over a wired link. The communications circuitry 632 can be configured, for example, to aid in the handling, receipt and transmission of secured financial data sent between two or more network devices, such as the interactive digital receipt system 602 and the customer device 604, and/or the interactive digital receipt system 602 and the merchant transaction system 606.

The I/O interface 634 includes one or more user input and output device interface mechanisms. The interface 634 may include a computer keyboard, touchpad, touchscreen, mouse, display device, and the corresponding physical ports and underlying supporting hardware and software to enable communications with other network devices in the system 600. Such communications include, but are not limited to, accepting user data input (e.g., authorization of payment) and providing output information to a user, programming and administering one or more functions to be executed by the corresponding device and the like.

The memory 636 includes one or more memories. The memory 636 may include, but are not limited to, cache memory, main memory and secondary memory. The memory 636 may include computer-readable instructions, where the computer-readable instructions may be executed by the processing system 630. In some embodiments, the memory 636 may include data storage (not shown) for storing data created and/or used by to the customer device 604.

The merchant transaction system 606 may be, for example, mobile devices and computing devices that can communicate with the interactive digital receipt system 602 and the customer device 604 through the network 608. The mobile devices include, but are not limited to, smartphones (e.g., Android®-enabled phones), personal digital assistants (PDAs), portable computers with wired or wireless wide-area-network and/or telecommunication capability such as tablet personal computers and "netbook" personal computers. The computing devices include, but are not limited to, personal computers, electronic point-of-sale cash registry machines, and electronic kiosks.

The merchant transaction system 606 includes a processor 640, communications circuitry 642, an input/output (I/O) interface 644, and a memory 646. These components may be coupled by one or more communication buses or other signal lines. It is noted that the system 606 can include more or fewer components.

The processor 640 includes one or more processors. The processor 640 is operatively coupled to the communication circuitry 642 and the memory 648. The one or more processors may include a digital signal processor, a microprocessor, and various analog-to-digital converters, digital-to-analog converters, and other support circuits and/or combinations thereof. The processor 640 may be configured to execute computer/machine readable and executable instructions stored in the local memory 648 or in a remote device memory (not shown). Such instructions are implemented by the processor 630 to perform one or more functions described above. In performing such functions, the processor 640 uses the communication circuitry 642 to communicate with the network 608 and other devices on the network 608, such as the interactive digital receipt system 602 and the customer device 604.

The communications circuitry 642 includes one or more mechanisms that enable the interactive digital receipt system 602, the customer device 604, and/or the merchant transaction system 606 to engage in communications over the network 608. The communications circuitry 642 may include RF circuitry and/or port for sending and receiving information. The RF circuitry permits transmission of information over a wireless link or network to one or more other devices and includes well-known circuitry for performing this function. The RF circuitry may enable WiFi, cellular, Bluetooth, Bluetooth low energy, global positioning system (GPS), near field communication (NFC), or other types of long range or short range communication. The port permits transmission of information over a wired link. The communications circuitry 642 can be configured, for example, to aid in the handling, receipt and transmission of secured financial data sent between two or more network devices, such as the merchant transaction system 606 and the customer device 604, and/or the merchant transaction system 606 the interactive digital receipt system 602.

The I/O interface 644 includes one or more user input and output device interface mechanisms. The interface may include a computer keyboard, touchpad, touchscreen, mouse, display device, and the corresponding physical ports and underlying supporting hardware and software to enable communications with other network devices in the system 600. Such communications include, but are not limited to, accepting user data input (e.g., credit card payment data via a POS device) and providing output information (e.g., communicating with the receipt system 602 to deliver an interactive digital receipt) to a user (e.g., user of the customer device 604), programming and administering one or more functions to be executed by the corresponding device and the like.

The memory 648 includes one or more memories. The one or more memories may be, for example, cache memory, main memory and secondary memory. The memory 648 includes computer-readable instructions, where the computer-readable instructions may be executed by the processor 640. In some embodiments, the memory 648 may include data storage (not shown) for storing data related to the financial transaction between the customer and the merchant.

What is claimed is:

1. A method comprising:
receiving, by one or more servers of a payment service from a point-of-sale (POS) device associated with a merchant, an indication of a transaction between the merchant and a customer of a plurality of customers of the merchant, wherein the indication includes a transaction amount;
generating, by the one or more servers of the payment service, an interactive digital receipt that includes: (i) transaction information associated with the transaction, and (ii) one or more interactive components;
transmitting, by the one or more servers of the payment service and to a device associated with the customer, the interactive digital receipt;
receiving, by the one or more servers of the payment service, feedback via an interactive feedback component of the one or more interactive components of the interactive digital receipt;
determining, by the one or more servers of the payment service, that the feedback was received within a timeframe satisfying a timeframe criterion; and
based on determining that the feedback was received within the timeframe, transmitting, by the one or more servers of the payment service and to the device associated with the customer, a reward.

2. The method of claim 1, wherein the reward is a fixed amount throughout the timeframe.

3. The method of claim 1, wherein the reward decreases in value based on a time, within the timeframe, of receiving the feedback from the customer.

4. The method of claim 1, wherein the timeframe corresponds to a setting set by the merchant and stored via a merchant profile maintained by the one or more servers of the payment service.

5. The method of claim 1, further comprising:
causing presentation of, by the one or more servers of the payment service and via a display of the POS device, a user interface, wherein the user interface displays aggregated feedback received from the plurality of customers, and wherein the user interface is interactable to at least one of analyze or respond to the feedback.

6. The method of claim 1, further comprising:
transmitting, by the one or more servers of the payment service, the feedback to a computing device of a third-party service provider.

7. The method of claim 1, wherein the feedback comprises at least one of a rating, a review, or a suggestion associated with at least one aspect of the transaction.

8. The method of claim 1, wherein the one or more interactive components further include an interactive tipping component.

9. The method of claim 1, wherein the one or more interactive components further include an interactive promotion component for the customer to redeem the reward or another reward.

10. The method of claim 1, wherein the one or more interactive components further include an interactive advertisement component.

11. The method of claim 1, wherein the one or more interactive components further include a loyalty rewards record associated with the customer and the merchant, wherein the loyalty rewards record includes a record of historical transactions between the customer and the merchant, and the method further comprising:
transmitting, by the one or more servers of the payment service, information to the device associated with the customer in response to a request associated with a selected historical transaction from the record of the historical transactions.

12. The method of claim 1, wherein the transaction information includes at least a merchant name, a customer name, a payment amount of the transaction, and a date of the transaction.

13. The method of claim 1, wherein the interactive digital receipt further includes an interactive transaction record comprising a record of one or more historical interactive digital receipts for historical transactions between the customer and the merchant.

14. One or more non-transitory computer-readable media storing instructions executable by one or more processors, that, when executed by the one or more processors, cause the one or more processors to perform acts comprising:
receiving, by one or more servers of a payment service from a point-of-sale (POS) device associated with a merchant, an indication of a transaction between the merchant and a customer of a plurality of customers of the merchant;
generating, by the one or more servers of the payment service, an interactive digital receipt that includes: (i) transaction information associated with the transaction, and (ii) one or more interactive components, wherein the one or more interactive components include an interactive feedback component;
transmitting, by the one or more servers of the payment service and to a device associated with the customer, the interactive digital receipt;
receiving, by the one or more servers of the payment service, feedback via the interactive feedback component;
determining, by the one or more servers of the payment service, that the feedback was received within a timeframe satisfying a timeframe criterion; and
based on determining that the feedback was received within the timeframe, transmitting, by the one or more servers of the payment service and to the device associated with the customer, a reward.

15. The one or more non-transitory computer-readable media of claim 14, wherein the reward decreases in value based on a time of receiving the feedback from the customer.

16. The one or more non-transitory computer-readable media of claim 14, the acts further comprising:
causing presentation of, by the one or more servers of the payment service and via a display of the POS device, a user interface, wherein the user interface displays aggregated feedback received from the plurality of customers, and wherein the user interface is interactable to at least one of analyze or respond to the feedback.

17. The one or more non-transitory computer-readable media of claim 14, the acts further comprising:
transmitting, by the one or more servers of the payment service, the feedback to a computing device of a third-party service provider.

18. A system comprising:
one or more processors; and
one or more non-transitory computer-readable media storing instructions executable by the one or more processors, wherein the instructions cause the one or more processors to perform acts comprising:
receiving, by one or more servers of a payment service from a point-of-sale (POS) device associated with a merchant, an indication of a transaction between the merchant and a customer of a plurality of customers of the merchant;
generating, by the one or more servers of the payment service, an interactive digital receipt that includes: (i) transaction information associated with the transaction, and (ii) one or more interactive components, wherein the one or more interactive components include an interactive feedback component;
transmitting, by the one or more servers of the payment service and to a device associated with the customer, the interactive digital receipt;
receiving, by the one or more servers of the payment service, feedback via the interactive feedback component;
determining, by the one or more servers of the payment service, that the feedback was received within a timeframe satisfying a timeframe criterion; and
based on determining that the feedback was received within the timeframe, transmitting, by the one or more servers of the payment service and to the device associated with the customer, a reward.

19. The system of claim 18, wherein the reward decreases in value based on a time of receiving the feedback from the customer.

20. The system of claim 18, wherein the feedback comprises at least one of a rating, a review, or a suggestion associated with at least one aspect of the transaction.

* * * * *